United States Patent
Sebot et al.

(10) Patent No.: US 7,272,622 B2
(45) Date of Patent: Sep. 18, 2007

(54) METHOD AND APPARATUS FOR PARALLEL SHIFT RIGHT MERGE OF DATA

(75) Inventors: Julien Sebot, Hillsboro, OR (US); William W. Macy, Palo Alto, CA (US); Eric Debes, Santa Clara, CA (US); Huy V. Nguyen, Pflugerville, TX (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 10/280,511

(22) Filed: Oct. 25, 2002

(65) Prior Publication Data

US 2003/0131030 A1 Jul. 10, 2003

Related U.S. Application Data

(63) Continuation-in-part of application No. 09/952,891, filed on Oct. 29, 2001.

(51) Int. Cl.
*G06F 5/01* (2006.01)

(52) U.S. Cl. .................................... 708/200; 708/209

(58) Field of Classification Search ............... 708/200, 708/209; 712/223
See application file for complete search history.

(56) References Cited

U.S. PATENT DOCUMENTS

| | | | |
|---|---|---|---|
| 5,781,457 A * | 7/1998 | Cohen et al. ............... | 708/231 |
| 5,909,572 A | 6/1999 | Thayer et al. | |
| 5,933,650 A | 8/1999 | van Hook et al. | |
| 6,115,812 A | 9/2000 | Abdallah et al. | |
| 6,211,892 B1 | 4/2001 | Huff et al. | |
| 6,430,684 B1 * | 8/2002 | Bosshart ..................... | 712/300 |
| 6,745,319 B1 | 6/2004 | Balmer et al. | |
| 2001/0016902 A1 | 8/2001 | Abdallah et al. | |
| 2002/0159529 A1 | 10/2002 | Wang et al. | |
| 2002/0172287 A1 | 11/2002 | Kim | |
| 2003/0231711 A1 | 12/2003 | Zhang et al. | |
| 2004/0098556 A1 * | 5/2004 | Buxton et al. ............... | 711/201 |
| 2004/0098567 A1 * | 5/2004 | Hansen et al. ............... | 712/223 |

(Continued)

FOREIGN PATENT DOCUMENTS

EP 0 130 380 A2 1/1985

(Continued)

OTHER PUBLICATIONS

Avaro, Olivier, et al., *MPEG-4 Systems Overview and Architecture*, woody.imag.fr/MPEG4/syssite/syspub/docs/tutorial/, May 28, 1998, pp. 1-71 plus Yahoo site ref.

(Continued)

*Primary Examiner*—D. H. Malzahn
(74) *Attorney, Agent, or Firm*—Blakely, Sokoloff, Taylor & Zafman LLP

(57) ABSTRACT

A method for a parallel shift right merge of data. The method of one embodiment comprises receiving a shift count of M. A first operand having a first set of L data elements is shifted left by 'L–M' data elements. A second operand having a second set of L data elements is shifted right by M data elements. The shifted first set is merged with the shifted second set to generate a resultant having L data elements.

22 Claims, 30 Drawing Sheets

U.S. PATENT DOCUMENTS

2004/0205323 A1* 10/2004 Hansen et al. ............... 712/221
2005/0108312 A1* 5/2005 Chen et al. .................. 708/513

FOREIGN PATENT DOCUMENTS

EP          0 363 176 A2    4/1990
WO      WO 03/038601 A1    5/2003

OTHER PUBLICATIONS

Bierling, M., *Displacement Estimation by Hierarchical Blockmatching*, SPIE, vol. 1001, Visual Communications and Image Processing, May 1998, pp. 942-951.

Chan, Y.L and W.C. Siu, *Adaptive Multiple-Candidate Hierarchical Search for Block Matching Algorithm*, IEE Electronics Letters, vol. 31, No. 19, Sep. 14, 1995, pp. 1637-1639.

Chan, Yui-Lam and Wan-Chi Siu, *New Adaptive Pixel Decimation for Block Motion Vector Estimation*, IEEE Transactions on Circuits and Systems on Video Technology, vol. 6, No. 1, Feb. 1996, pp. 113-118.

Chen, Liang-Gee, Wai-Ting Chen, Yeu-Shen Jehng Tzi-Dar Chuieh, *An Efficient Parallel Motion Estimation Algorithm for Digital Image Processing*, IEEE Transactions on Circuits and Systems on Video Technology, vol. 1, No. 4, Dec. 1991, pp. 378-384.

Cheng, K.W., S.C. Chan, *Fast Block Matching Algorithms for Motion Estimation*, ICASSP96, 1996, pp. 2318ff.

Corbal, Jesus, et al., *DLP+TLP Processors for the Next Generation of Media Workloads*, 0-7695-1019-1/01, IEEE, 2001, pp. 219-228.

Day, Neil, Ed., *Introduction to MPEG-7 (v.3.0)*, International Organization for Standardization, ISO/IEC JTC1/SC29/WG11, Coding of Moving Pictures and Audio, #N4032, Mar. 2001, pp. 1-10.

Dufaux, Frederic, et al., *Efficient, Robust, and Fast Global Motion Estimation for Video Coding*, 1057-7149/00, IEEE, 2000, pp. 497-501.

Eckart, Stefan, Chad Fogg, *ISO/IEC MPEG-2 Software Video Codec*, SPIE vol. 2419, Digital Video Compression: Algorithms and Technologies, 1995, San Jose, CA.

Edirisinghe, E.A., et al., *Shape Adaptive Padding for MPEG-4*, 0098 3063/00, IEEE, 2000, pp. 514-520.

Feng, J., Lo, K. T. Mehrpour, H. Karbowiak, A.E, *Adaptive Block-Matching Motion Estimation Algorithm for Video Coding*, IEE Electronics Letters, vol. 31, No. 18, 1995, pp. 1542-1543.

Furht, Botho, Joshua Greenberg, Raymond Westwater, *Motion Estimation Algorithm for Video Compression*, Kluwer Academic Publishers, Boston, 1997, pp. cover-vi, 11, 49-95.

Ghanbari, M., *The Cross-Search Algorithm for Motion Estimation*, IEEE Transactions on Communications, vol. 38, No. 7, Jul. 1990, pp. 950-953.

He, Zhongli, M.L. Liou, *A High Performance Fast Search Algorithm for Block Matching Motion Estimation*, IEEE Transactions on Circuits and Systems on Video Technology, vol. 7, No. 5, Oct. 1997, pp. 826-828.

He, Zhong-Li, M.L. Liou, *Design of Fast Motion Estimation Algorithm based on Hardware Consideration*, IEEE Transactions on Circuits and Systems on Video Technology, vol. 7, No. 5, Oct. 1997, pp. 819-823.

Heising, G., et al., *MoMuSys: MPEG-4 Version 2 Video Reference Software Package*, AC098/HHI/WP5.1/DS/P/049/B1, 1998, Abstract and pp. 1-8.

Intel Corporation, *Blocking-Matching in Motion Estimation Alforithms Using Streaming SIMD Extensions 2 (SSE2)*, Vers. 2.0 Sep. 22, 2000, Order No. 248605-001, pp. 1-13, A-1, A-2.

International Organisation for Standardisation, *Optimization Model, Version 2.0*, ISO/IEC JTC1/SC29/WG11, Coding of Moving Pictures and Audio, #N3675, Oct. 2000, 12 pp.

International Organisation for Standardisation, *New MPEG-4 Profiles Under Consideration*, ISO/IEC JTC1/SC29/WG11, Coding of Moving Pictures and Audio, #N3932, Jan. 2001, pp. 1-35.

Jain, J., A. Jain, *Displacement Measurement and its Application in Interframe Image Coding*, IEEE Transactions on Communications, vol. 29, No. 12, Dec. 1981, pp. 1799-1808.

Ju, John C.-H., et al., *A Fast Rate-Optimized Motion Estimation Algorithm for Low-Bit-Rate Video Coding*, 1051-8215/99, IEEE, 1999, pp. 994-1002.

Jung, Hae Mook, Duch Dong Hwang Coong Soo Park, Han Soo Kim, *An Annular Search Algorithm for Efficient Motion Estimation*, International Picture Coding Symposium, PCS96, 1996, pp. 171-174.

Kappagantula, S., K.R. Rao, *Motion Compensated Interframe Image Prediction*, IEEE Transactions on Communications, 33(9), Sep. 1985, pp. 1011-1015.

Kim, Joon-Seek, Rae-Hong Park, *A Fast Feature-Based Block Matching Algorithm Using Integral Projections*, IEEE Journal on Selected areas in communications, vol. 10, No. 5, Jun. 1992, pp. 968-971.

Kim, Michelle, Ed., *MPEG-4 Systems*, International Organization for Standardization, ISO/IEC JTC1/SC29/WG11, Coding of Moving Pictures and Audio, #N3383, Jun. 2000, pp. 1-19.

Kneip, Johannes, et al., *Applying and Implementing the MPEG-4 Multimedia Standard*, 0272-1732/99, IEEE, 1999, pp. 64-74.

Kneip, J. (Johannes), et al., *The MPEG-4 Video Coding Standard—a VLSI Point of View*, IEEE Workshop on Signal Processing Systems (SIPS98), Oct. 8-10, 1998, pp. 43-52, A-1, A-2.

Koga, J., et al., *Motion Compensated Interframe Coding for Video Conference*, Proceedings of the National Telecommunications Conference, 1981, pp. G5.3.1-5.3.3.

Köenen, Rob, Ed., *Overview of the MPEG-4 Standard*, International Organization for Standardization, ISO/IEC JTC1/SC29/WG11, Coding of Moving Pictures and Audio, #N4030, Mar. 2001, pp. 1-69.

Kuhn, P., *Algorithms, Complexity Analysis and VLSI Architectures for MPEG-4 Motion Estimation*, 1999 Kluwer Academic Publishers, Boston, pp. cover-vi, 15, 17-59, 107-109, 119-121, 147-167, and 189-204.

Kuhn, P., Stechele W., *Complexity Analysis of the Emerging MPEG-4 Standard as a Basis for VLSI Implementation*, vol. SPIE 3309 Visual Communications and Image Processing, San Jose, Jan. 1998, pp. 498-509.

Lee, Liang-Wei, Jhing-Fa Wang, Jau- Yien Lee, Jung-Dar Shie, *Dynamic Search-Window Adjustment and Interlaced Search Block-Matching Algorithm*, IEEE Transactions on circuits and systems for video technology, vol. 3, No. 1, Feb. 1993, pp. 85-87.

Lee, W., Y. Kim, R.J. Gove, C.J. Read, *Media Station 5000: Integrating Video and Audio*, IEEE Multimedia, vol. 1, No. 4, 1994, pp. 50-61.

Lee, Xiaobing, Ya-Qin Zhang, *A Fast Hierarchical Motion-Compensation Scheme for Video Coding Using Block-Feature Matching*, IEEE Transactions on Circuits and Systems for Video Technology, vol. 6, No. 6, Dec. 1996, pp. 627-635.

Lengwehasatit, Krisda, et al., *A Novel Computationally Scalable Algorithm for Motion Estimation*, SPIE 3309 VCIP Visual Communications and Image processing, San Jose, CA, Jan. 1998, pp. 66-79.

Li, R., B. Zeng, M.L. Liu, *A New Three-Step Search Algorithm for Block Motion Estimation*, IEEE Transactions on Circuits and Systems on Video Technology, vol. 4, No. 4, Aug. 1994, pp. 438-442.

Li, W., E. Salari, *Successive Elimination Algorithm for Motion Estimation*, IEEE Trans. Image Processing, vol. 4, Jan. 1995, pp. 105-107.

Liang, Jie, et al., *Region-Based Video Coding with Embedded Zero-Trees*, 1068-0314/97, IEEE, 1997, p. 449.

Liu, B., A. Zaccarin, *New Fast Algorithms for the Estimation of Block Motion Vectors*, IEEE Transactions on Circuits and Systems on Video Technology, vol. 3, No. 2, Apr. 1993, pp. 148-157.

Liu, Lurng-Kuo, Ephraim Feig, *A Block-Based Gradient Descent Search Algorithm for Block-Based Motion Estimation in Video Coding*, IEEE Transactions on Circuits and Systems on Video Technology, vol. 6, No. 4, Aug. 1996, pp. 419-422.

Mo, Hyeon-Cheol, et al., *A High-Speed Pattern Decoder in MPEG-4 Padding Block Hardware Accelerator*, 0-7803-6685-9/01, IEEE, 2001, pp. II-197-II-200.

Moschetti, F., et al., *About Macroblock Subsampling for Motion Estimation on IA-64*, Proc. of 2001 IEEE Int'l. Conf. on Multimedia and Expo ((ICME 2001), Tokyo, Japan, Aug. 2001, 4 pp.

Moschetti, F., et al., *A Fast Block Matching for SIMD Processors Using Subsampling*, IEEE #0-7803-5482-6/99, pp. IV-321-IV-324.

Nam, Kwon Moon, Joon-Seek Kim, Rae-Hong Park, Young Serk Shim, *A Fast Hierarchical Motion Vector Estimation Algorithm Using Mean Pyramid*, IEEE Transactions on Circuits and Systems on Video Technology, vol. 5, No. 4, Aug. 1995, pp. 344-351.

Netravali, A., B. Haskell, *Digital Pictures Representation and Compression*, New York, Plenum, 1988, pp. cover-xv, 334-340, 537-542, and 354-355.

Pirsch, Peter, Nicolas Demassieux, Winfried Gehrke, *VLSI Architectures for Video Compression—A Survey*, Proceedings of the IEEE, vol. 83, No. 2, Feb. 1995, pp. 220-246.

Po, Lai-Man, Wing-Chung Ma. *A Novel Four-Step Search Algorithm for Fast Blockmatching*, IEEE Transactions on Circuits and Systems on Video Technology, vol. 6, No. 3, Jun. 1996, pp. 313-317.

Puri, A., H.M. Hang, D.L. Schilling, *An Efficient Blockmatching Algorithm for Motion Compensated Coding*, Proc. IEEE ICASSP, 1987, pp. 2.4.1-25.4.4.

Ragsdale, Gary L., et al, *Relationships of Popular Transmission Characteristics to Perceived Quality for Digital Video Over ATM*, National Communications System, Technical Information Bulletin 99-2, Jan. 1999, 64 pp.

Ramkishor, K., et al., *Real Time Implementation of MPEG-4 Video Decoder on ARM7TDMI*, Proc. of 2001 Int'l. Symposium on Intelligent Multimedia, Video and Speech Processing, May 2-4, 2001, pp. 522-526.

Shi, Y.Q., X. Xia, *A Thresholding Multiresolution Block Matching Algorithm*, IEEE Transactions on Circuits and Systems on Video Technology, vol. 7, No. 2, Apr. 1997, pp. 437-440.

Sikora, Thomas, *MPEG Digital Video Coding Standards*, Preprint from Digital Consumer Electronics Handbook, 1st Ed., McGraw-Hill Book Co., Ch. 9, pp. 1-43.

Sikora, Thomas, *MPEG-1 and MPEG-2 Digital Video Coding Standards*, Preprint from Digital Consumer Electronics Handbook, 1st Ed., McGraw-Hill Book Co., pp. 1-43.

Sikora, Thomas, *The Structure of the MPEG-4 Video Coding Algorithm*, Preprint from Digital Consumer Electronics Handbook, 1st Ed., McGraw-Hill Book Co., pp. 1-16.

Diefendorff, K., et al., "AltiVec Extension to PowerPC Accelerates Media Processing," IEEE, #0272-1732/00, 2000, pp. 85-95.

PCT International Search Report for PCT International Application No. US03/33086, mailed Oct. 28, 2004 (7 pgs.).

Song, Byung Cheol, Jong Beom Ra, *A Hierarchical Block Matching Algorithm Using Partial Distortion Criteria*, SPIE 3309 VCIP Visual Communications and Image Processing, 1998, San Jose, CA, pp. 88-95.

Srinivasan, Ram and K.R. Rao, *Predictive Coding Based on Efficient Motion Estimation*, IEEE Transactions on Circuits and Systems on Video Technology, vol. Com-33, No. 8, Aug. 1985, pp. 888-896.

Stolberg, H.-J., et al., *The M-Pire MPEG-4 Codec DSP and Its Macroblock Engine*, 0-7803-548206/99, IEEE, 2000, pp. II-192-II-195.

Tham, Jo Yew, et al., *Transactions Letters: A Novel Unrestricted Center-Biased Diamond Search Algorithm for Block Motion Estimation*, IEEE, 1051-8215/98, 1998, pp. 369-377.

van der Schaar, M., et al., *Near-Lossless Complexity-Scalable Embedded Compression Algorithm for Cost Reduction in DTV Receivers*, 0098 3063/00, IEEE, 2000, pp. 923-933.

Wang, Chung-Neng, et al., *Improved MPEG-4 Visual Texture Coding Using Double Transform Coding*, 0-7803-6685-9/01, IEEE, 2001, pp. V-227-V-230.

Westerink, P. H., et al., *Two-Pass MPEG02 Variable-Bit-Rate Encoding*, IBM J. Res. Develop, vol. 43, No. 4, Jul. 1999, pp. 471-488.

Wittenburg, J.P., et al., *HiPAR-DSP: A Parallel VLIW RISC Processor for Real Time Image Processing Applications*, (0-7803-4229-1/97) IEEE, 1997, pp. 155-162.

Xu, Jie-Bin, Lai-man Po, and Chok-Kwan Cheung, *A New Prediction Model Search Algorithm for Fast Block Motion Estimation*, IEEE Int. Conf. Image Processing, ICIP97, Santa Barbara, 1997.

Yu, Fengqi and Alan N. Willson, Jr., *A Flexible Hardware-Oriented Fast Algorithm for Motion Estimation*, ICASSP97, 1997, pp. 2681ff.

Zhu, Shan, Kai-Kuang Ma, *A New Diamond Search Algorithm for Fast Block Matching*, IEEE Transactions on Circuits and Systems on Video Technology, vol. 9, No. 2, Feb. 2000, pp. 287-290.

\* cited by examiner

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • • • | | | bbbb bbbb | bbbb bbbb | bbbb bbbb |

UNSIGNED PACKED BYTE IN-REGISTER REPRESENTATION 310

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • • • | | | sbbb bbbb | sbbb bbbb | sbbb bbbb |

SIGNED PACKED BYTE IN-REGISTER REPRESENTATION 311

FIG. 4A

| 127 | 112 111 | | 16 15 | 0 |
|---|---|---|---|---|
| | wwww wwww wwww | ... | wwww wwww wwww wwww | |

UNSIGNED PACKED WORD IN-REGISTER REPRESENTATION

| 127 | 112 111 | | 16 15 | 0 |
|---|---|---|---|---|
| | swww wwww wwww | ... | swww wwww wwww wwww | |

SIGNED PACKED WORD IN-REGISTER REPRESENTATION

FIG. 4B

| 127 | 96 95 | | 32 31 | 0 |
|---|---|---|---|---|
| | dddd dddd dddd dddd dddd dddd dddd dddd | ... | dddd dddd dddd dddd dddd dddd dddd dddd | |

UNSIGNED DOUBLEWORD IN-REGISTER REPRESENTATION

| 127 | 96 95 | | 32 31 | 0 |
|---|---|---|---|---|
| | sddd dddd dddd dddd dddd dddd dddd dddd | ... | sddd dddd dddd dddd dddd dddd dddd dddd | |

SIGNED DOUBLEWORD IN-REGISTER REPRESENTATION

FIG. 4C

FIG. 7A PSHUFD

502: `0 0 0 0 0 0 0 0 0 0 0 0 0 F3 F2 F1`

FIG. 7B PMADDUSBW

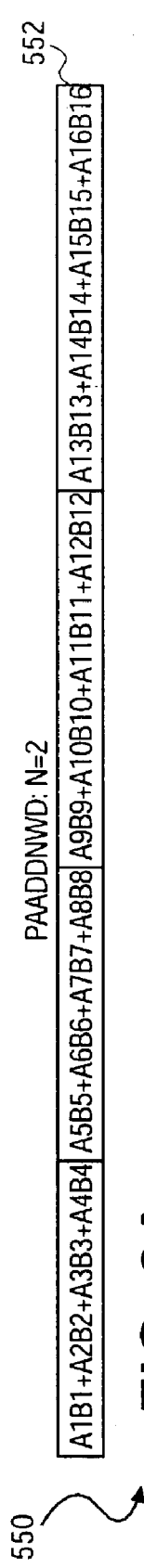
FIG. 8A
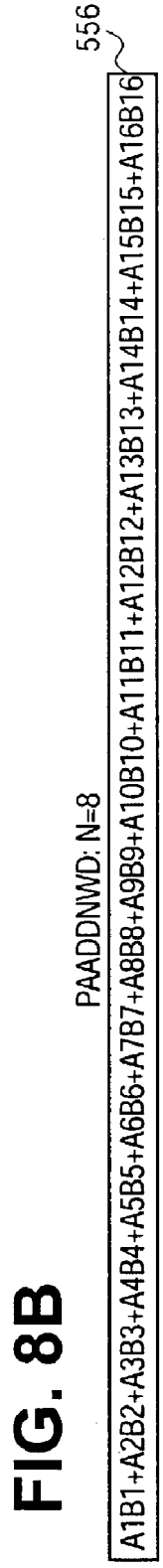
FIG. 8B
FIG. 8C
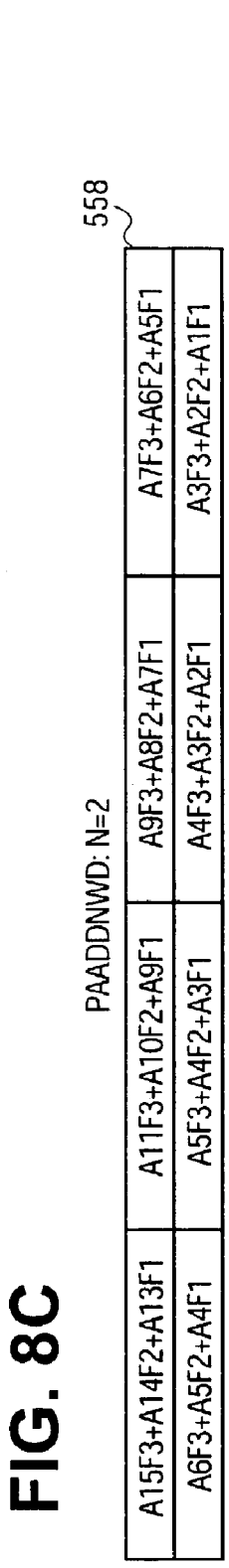
FIG. 8D

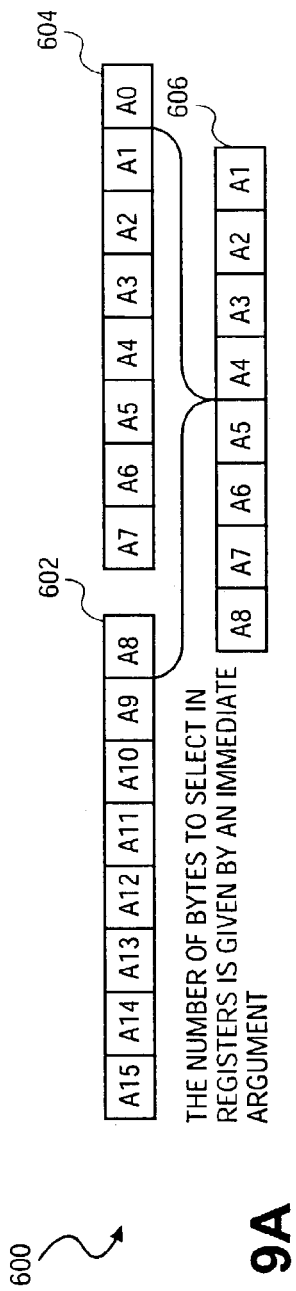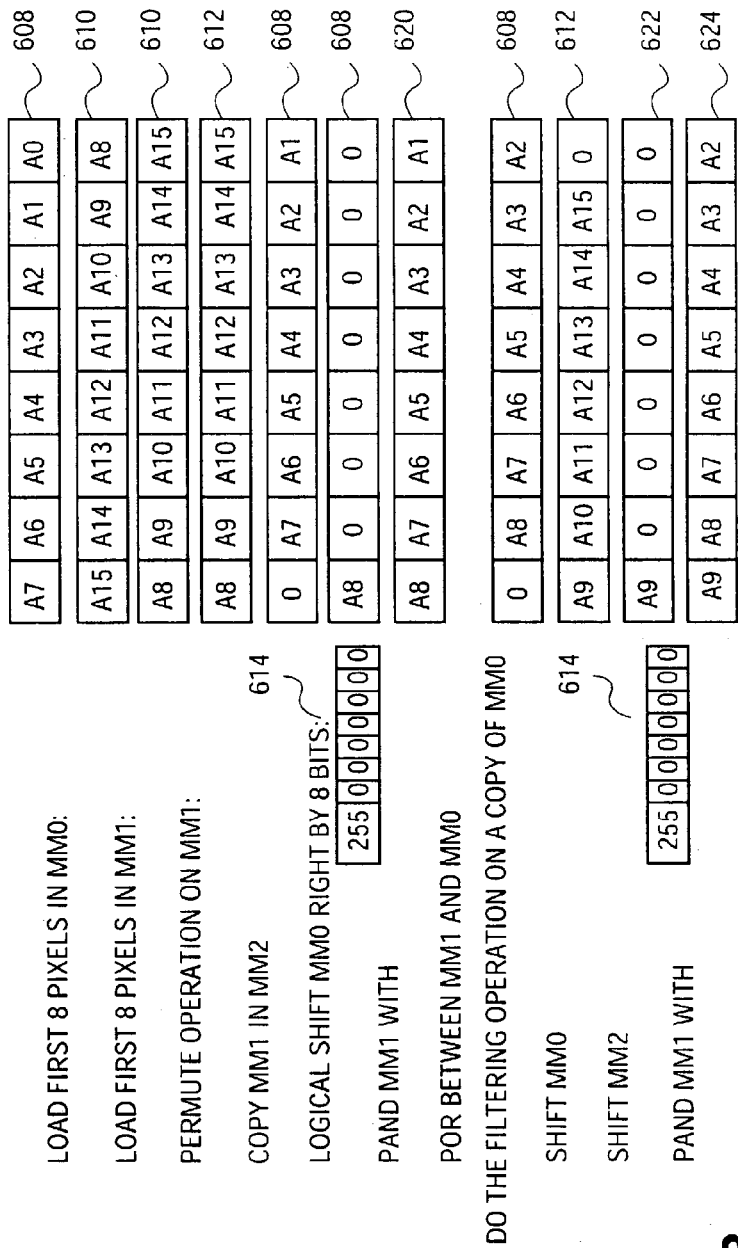
FIG. 9A
FIG. 9B

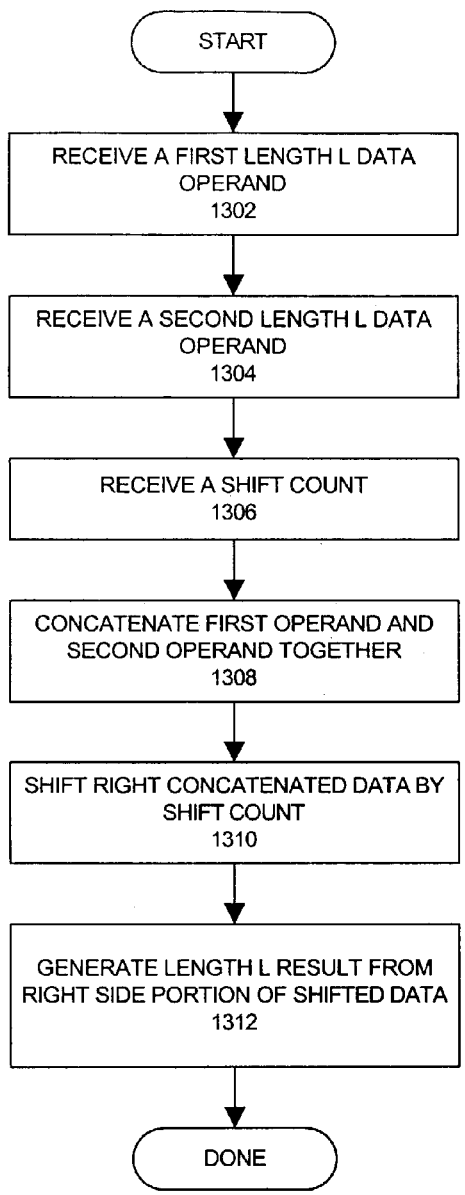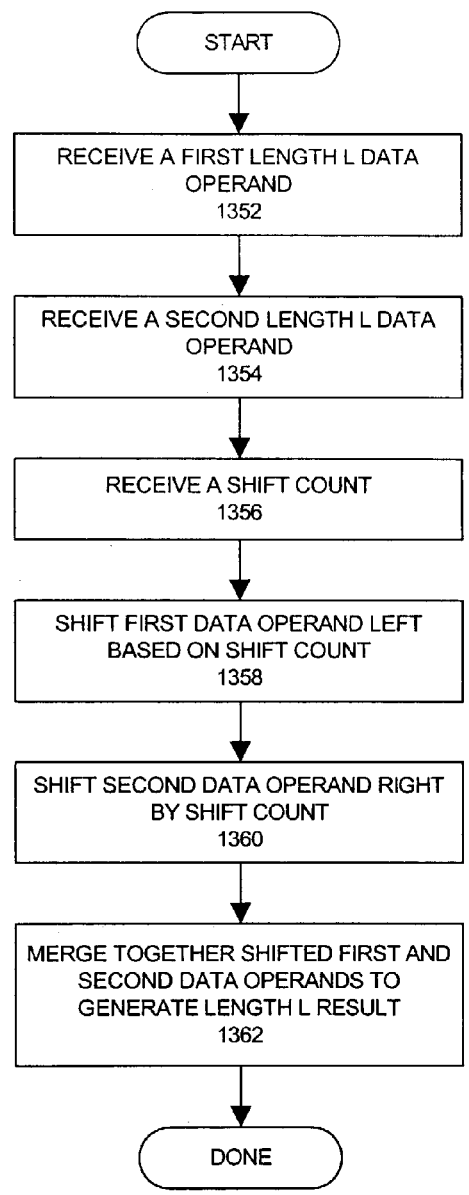
FIG. 18A
FIG. 18B

METHOD AND APPARATUS FOR PARALLEL SHIFT RIGHT MERGE OF DATA

This patent application is a Continuation In Part of U.S. patent application Ser. No. 09/952,891, entitled "An Apparatus And Method For Efficient Filtering And Convolution Of Content Data", filed Oct. 29, 2001.

The patent application is related to co-pending U.S. patent application Ser. No. 10/280,612, entitled "Fast Full Search Motion Estimation With SIMD Merge Instruction" filed on Oct. 25, 2002.

FIELD OF THE INVENTION

The present invention relates generally to the field of microprocessors and computer systems. More particularly, the present invention relates to a method and apparatus for parallel shift right merge of data.

BACKGROUND OF THE INVENTION

A processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing (PC) experience will be even richer in audio-visual effects, as well as being easier to use, and more importantly, computing will merge with communications.

Accordingly, the display of images, as well as playback of audio and video data, which is collectively referred to herein as content, have become increasingly popular applications for current computing devices. Filtering and convolution operations are some of the most common operations performed on content data, such as image audio and video data. As known to those skilled in the art, filtering and correlation calculations are computed with a multiply-accumulate operation that adds the products of data and co-efficients. The correlation of two vectors, A and B, consists in the calculation of the sum S:

$$S[k] = \frac{1}{N}\sum_{i=0}^{N-1} a[i] \cdot b[i+k], \quad \text{Equation (1)}$$

that is very often used with k=0:

$$S[0] = \frac{1}{N}\sum_{i=0}^{N-1} a[i] \cdot b[i] \quad \text{Equation (2)}$$

In case of an N tap filter f applied to a vector V, the sum S to be calculated is the following:

$$S = \sum_{i=0}^{N-1} f[i] \cdot V[i] \quad \text{Equation (3)}$$

Such operations are computationally intensive, but offer a high level of data parallelism that can be exploited through an efficient implementation using various data storage devices, such as for example, single instruction multiple data (SIMD) registers.

Applications of filtering operations are found in a wider array of image and video processing tasks and communications. Examples of uses of filters are reduction of block artifacts in motion picture expert group (MPEG) video, reducing noise and audio, decoupling watermarks from pixel values to improve watermark detection, correlation for smoothing, sharpening, reducing noise, finding edges and scaling the sizes of images or video frames, up sampling video frames for sub-pixel motion estimation, enhancing audio signal quality, and pulse shaping and equalizing the signal in communications. Accordingly, filtering as well as convolution operations are vital to computing devices which offer playback of content, including image, audio and video data.

Unfortunately, current methods and instructions target the general needs of filtering and are not comprehensive. In fact, many architectures do not support a means for efficient filter calculations for a range of filter lengths and data types. In addition, data ordering within data storage devices such as SIMD registers, as well as a capability of adding adjacent values in a register and for partial data transfers between registers, are generally not supported. As a result, current architectures require unnecessary data type changes which minimizes the number of operations per instruction and significantly increases the number of clock cycles required to order data for arithmetic operations.

BRIEF DESCRIPTION OF THE DRAWINGS

The present invention is illustrated by way of example and not limitations in the figures of the accompanying drawings, in which like references indicate similar elements, and in which:

FIG. 4A illustrates an in-register packed byte representations according to one embodiment of the present invention.

FIG. 4B illustrates an in-register packed word representation according to one embodiment of the present invention.

FIG. 4C illustrates an in-register packed double word representations according to one embodiment of the present invention.

FIGS. 7A-7C depict block diagrams illustrating the byte shuffle instruction of FIG. 5 combined with the byte multiply accumulate instruction as depicted in FIG. 6 to generate a plurality of summed-product pairs in accordance with a further embodiment of the present invention.

FIGS. 8A-8D depict block-diagrams illustrating an adjacent-add instruction in accordance with a further embodiment of the present invention;

FIGS. 9A and 9B depict a register merge instruction in accordance with a further embodiment of the present invention.

FIG. 18A is a flow chart illustrating one embodiment of a method to shift right and merge data operands in parallel;

FIG. 18B is a flow chart illustrating another embodiment of a method to shift right and merge data;

DETAILED DESCRIPTION

Figure 1:
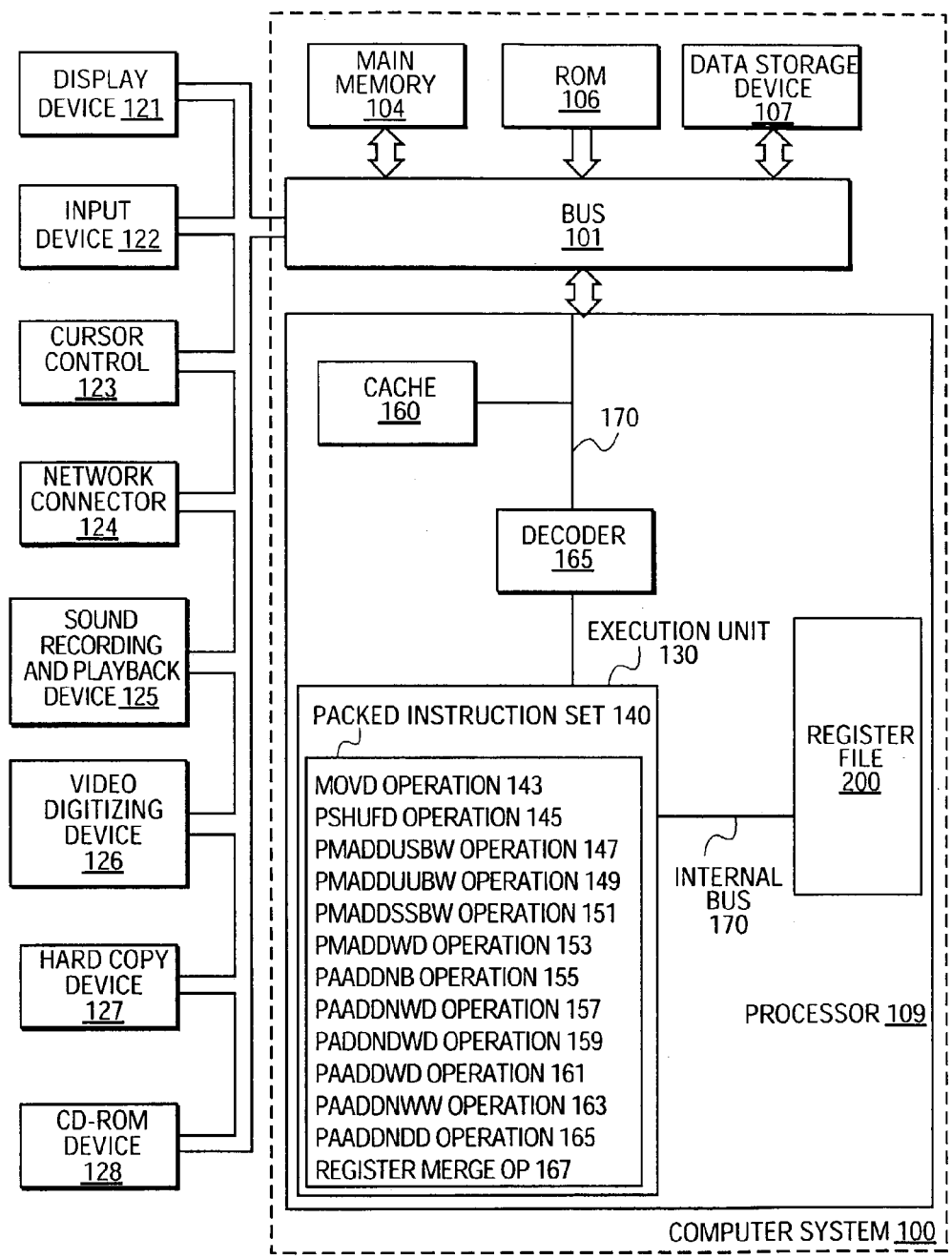
FIG. 1 depicts a block diagram illustrating a computer system capable of implementing of one embodiment of the present invention.

A method and apparatus for performing a parallel shift right merge on data is disclosed. A method and apparatus for efficient filtering and convolution of content data are also described. A method and apparatus for a fast full search motion estimation with SIMD merge operations is also disclosed. The embodiments described herein are described in the context of a microprocessor, but are not so limited. Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which shift right merge of data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product or software which may include a machine or computer-readable medium having stored thereon instructions which may be used to program a computer (or other electronic devices) to perform a process according to the present invention. Such software can be stored within a memory in the system. Similarly, the code can be distributed via a network or by way of other computer readable media. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, or the like. Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Embodiments of the present invention provide a way to implement a parallel shift right instruction as an algorithm that makes use of SIMD related hardware. For one embodiment, the algorithm is based on the concept of right shifting a desired number of data segments from one operand into the most significant side of a second operand as the same number of data segments are shifted out the least significant side of the second operand. Conceptually, the right shift merge operation can be viewed as merging two block of data together as one block and shifting the joined block to align the data segments at the desired location to form a new pattern of data. Thus embodiments of a shift right merge algorithm in accordance with the present invention can be implemented in a processor to support SIMD operations efficiently without seriously compromising overall performance.

Computing Architecture

FIG. 1 shows a computer system 100 upon which one embodiment of the present invention can be implemented. Computer system 100 comprises a bus 101 for communicating information, and processor 109 coupled to bus 101 for processing information. The computer system 100 also includes a memory subsystem 104-107 coupled to bus 101 for storing information and instructions for processor 109.

Processor 109 includes an execution unit 130, a register file 200, a cache memory 160, a decoder 165, and an internal bus 170. Cache memory 160 is coupled to execution unit 130 and stores frequently and/or recently used information for processor 109. Register file 200 stores information in processor 109 and is coupled to execution unit 130 via internal bus 170. In one embodiment of the invention, register file 200 includes multimedia registers, for example, SIMD registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. Processor 109 is capable of supporting the Pentium® microprocessor instruction set and the packed instruction set 140. By including packed instruction set 140 in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the packed instruction set 140 includes instructions (as described in further detail below) for a move data (MOVD) operation 143, and a data shuffle operation (PSHUFD) 145 for organizing data within a data storage device. A packed multiply and accumulate for an unsigned first source register and a signed second source register (PMADDUSBW operation 147). A packed multiply-accumulate operation (PMADDUUBW operation 149) for performing a multiply and accumulate for an unsigned first source register and an unsigned second source register. A packed multiply-accumulate (PMADDSSBW operation 151) for signed first and second source registers and a standard multiply accumulate (PMADDWD operation 153) for signed first and second source registers containing 16-bit data. Finally, the packed instruction set includes an adjacent-add instruction for adding adjacent bytes (PAADDNB operation 155), words (PAADDNWD operation 157), and doublewords (PAADDNDWD 159), two word values (PAADDWD 161), two words to produce a 16-bit result (PAADDNWW operation 163), two quadwords to produce a quadword result (PAADDNDD operation 165) and a register merger operation 167.

By including the packed instruction set 140 in the instruction set of the general-purpose processor 109, along with associated circuitry to execute the instructions, the operations used by many existing multimedia applications may be performed using packed data in a general-purpose processor. Thus, many multimedia applications may be accelerated and executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the present invention may include a display device 121 such as a monitor. The display device 121 may include an intermediate device such as a frame buffer. The computer system 100 also includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN).

Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124-128 are also coupled to bus 101.

Processor

Figure 2:
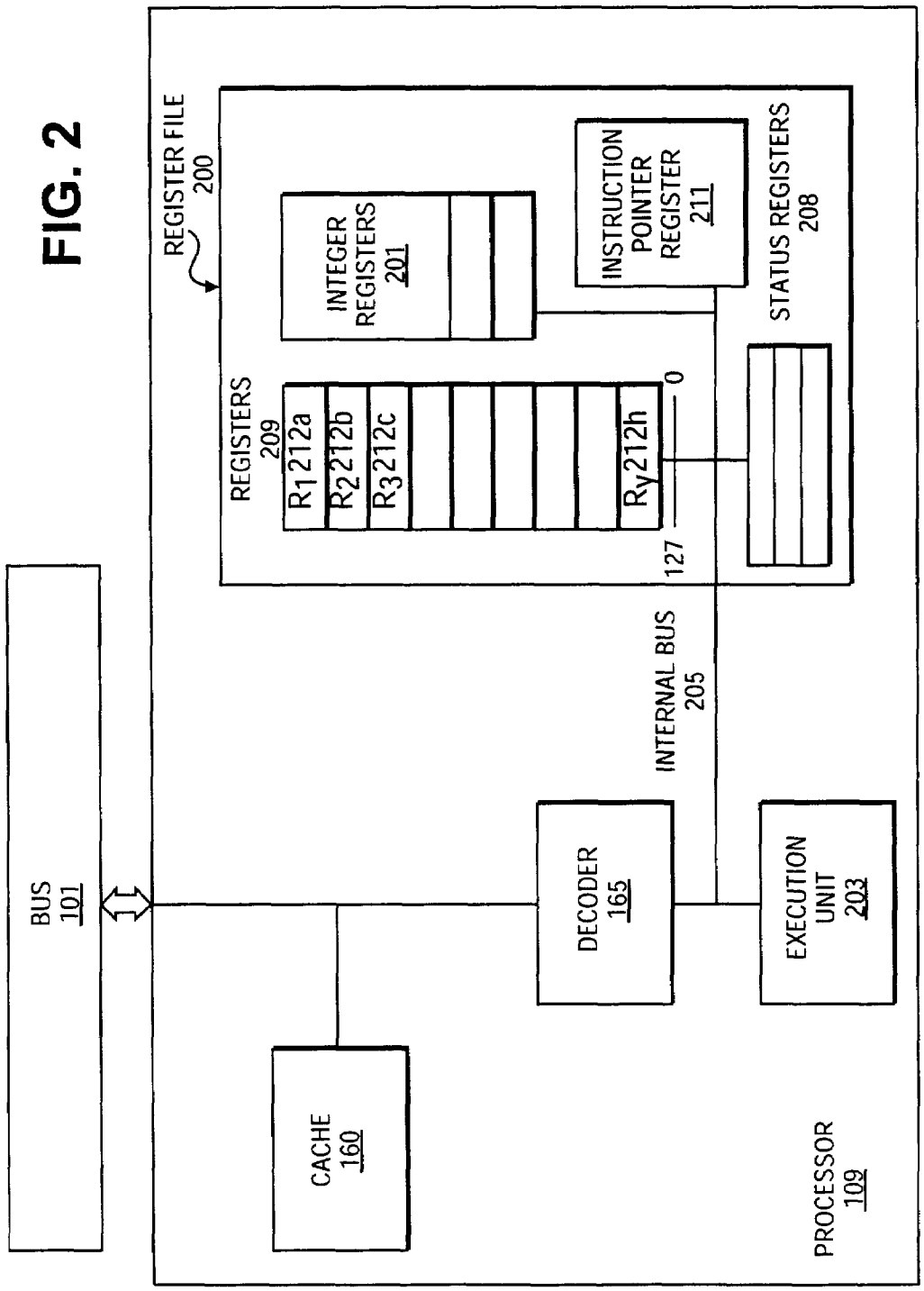
FIG. 2 depicts a block diagram illustrating an embodiment of the processor as depicted in FIG. 1 in accordance with a further embodiment of the present invention.

FIG. 2 illustrates a detailed diagram of processor 109. Processor 109 can be implemented on one or more substrates using any of a number of process technologies, such as, BiCMOS, CMOS, and NMOS. Processor 109 comprises a decoder 202 for decoding control signals and data used by processor 109. Data can then be stored in register file 200 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight multimedia registers, $R_0$ 212a through $R_7$ 212h, for example, SIMD registers containing packed data. Each register in registers 209 is one hundred twenty-eight bits in length. R1 212a, R2 212b and R3 212c are examples of individual registers in registers 209. Thirty-two bits of a register in registers 209 can be moved into an integer register in integer registers 201. Similarly, a value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are one hundred twenty-eight bits in length and integers are represented as one hundred twenty-eight bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 160 is an optional element of processor 109 and can be used to cache data and/or control signals from, for example, main memory 104. Cache 160 is connected to decoder 202, and is connected to receive control signal 207.

Data and Storage Formats

Figure 3:
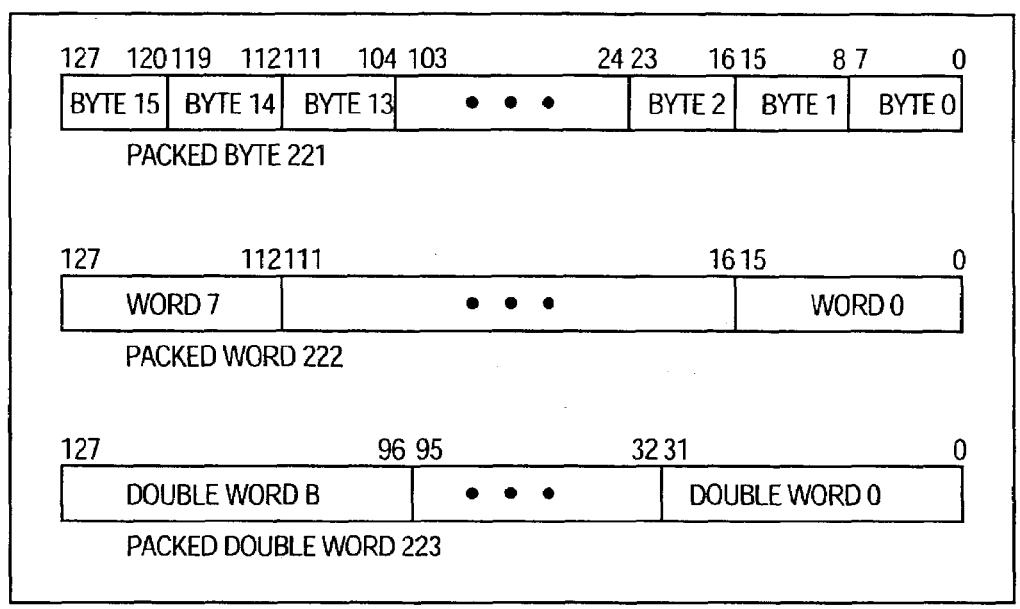
FIG. 3 depicts a block diagram illustrating a packed data types according to a further embodiment of the present invention.

FIG. 3 illustrates three packed data-types: packed byte 221, packed word 222, and packed doubleword (dword) 223. Packed byte 221 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 222 is one hundred twenty-eight bits long and contains eight packed word data elements. Each packed word contains sixteen bits of information. Packed doubleword 223 is one hundred twenty-eight bits long and contains four packed doubleword data elements. Each packed doubleword data element contains thirty-two bits of information. A packed quadword is one hundred twenty-eight bits long and contains two packed quad-word data elements.

FIGS. 4A-4C illustrate the in-register packed data storage representation according to one embodiment of the invention. Unsigned packed byte in-register representation 310 illustrates the storage of an unsigned packed byte 201 in one of the multimedia registers 209, as shown in FIG. 4A. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen.

Thus, all available bits are used in the register. This storage arrangement increases the storage efficiency of the processor. As well, with sixteen data elements accessed, one operation can now be performed on sixteen data elements simultaneously. Signed packed byte in-register representation 311 illustrates the storage of a signed packed byte 221. Note that the eighth bit of every byte data element is the sign indicator.

Unsigned packed word in-register representation 312 illustrates how word seven through word zero are stored in a register of multimedia registers 209, as illustrated in FIG. 4B. Signed packed word in-register representation 313 is similar to the unsigned packed word in-register representation 312. Note that the sixteenth bit of each word data element is the sign indicator. Unsigned packed doubleword in-register representation 314 shows how multi-media registers 209 store two doubleword data elements, as illustrated in FIG. 4C. Signed packed doubleword in-register representation 315 is similar to unsigned packed doubleword in-register representation 314. Note that the necessary sign bit is the thirty-second bit of the doubleword data element.

Efficient filtering and convolution of content data, as taught by the present invention, begins with loading of data source devices with data and filter/convolution co-efficients. In many cases, the order of data or coefficients within a data storage device, such as for example a single instruction multiple data (SIMD) register, require change before arithmetic calculations can be made. Accordingly, efficient filter calculations and convolution require not only appropriate arithmetic instructions, but also efficient methods for organizing the data required to make the calculations.

For example, using the notation in the background section, images are filtered by replacing the value of, for example pixel I given by S[I]. Values of pixels on either side of pixel I are used in the filter calculation of S[I]. Similarly, pixels on either side of pixel I+1 are required to compute the S[I+1]. Consequently, to compute filter results for more than one pixel in an SIMD register, data is duplicated and, arranged in the SIMD register for the calculation.

Figure 5:
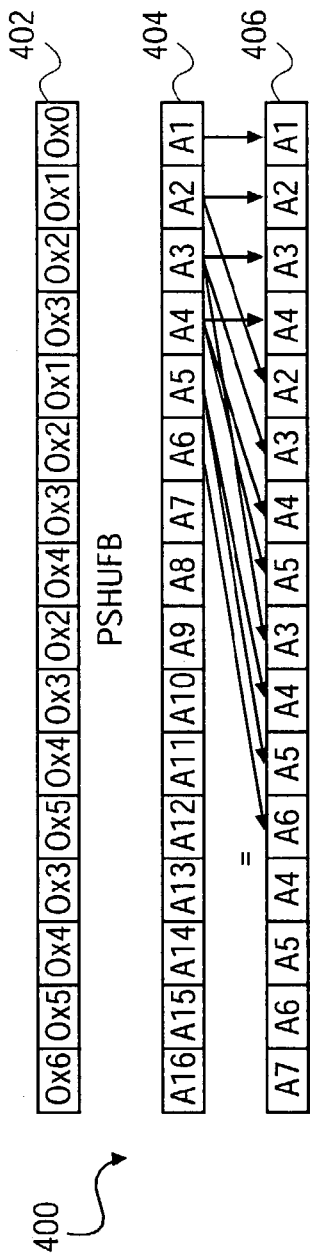
FIG. 5 depicts a block diagram illustrating operation of a byte shuffle instruction in accordance with an embodiment of the present invention.

Unfortunately, current computing architectures lack an efficient way of arranging data for all of the appropriate data sizes within the computing architecture. Accordingly, as depicted in FIG. 5, the present invention includes a byte shuffle instruction (PSHUFB) 145 that efficiently orders data of any size. The byte shuffle operation 145 orders data sizes, which are larger than bytes, by maintaining the relative position of bytes within the larger data during the shuffle operation. In addition, the byte shuffle operation 145 can change the relative position of data in an SIMD register and can also duplicate data.

Referring again to FIG. 5, FIG. 5 depicts an example of a byte shuffle operation 145 for a filter with three co-efficients. Using conventional techniques, filter coefficients (not shown) would be applied to three pixels and then the filter co-efficients are moved to another pixel and applied again. However, in order to perform these operations in parallel, the present invention describes a new instruction for the data arrangement. Accordingly, as depicted in FIG. 5, the data 404 is organized within a destination data storage device 406, which in one embodiment is the source data storage device 404, utilizing a mask 402 to specify the address wherein respective data elements are stored in the destination register 406. In one embodiment, the arrangement of the mask is based on the desired data processing operation, which may include for example, a filtering operation, a convolution operation or the like.

Accordingly, using the mask 402, processing of the data 406, along with the coefficients, can be performed in parallel. In the example described, the source data storage device 404 is a 128-bit SIMD register, which initially stores sixteen 8-bit pixels. As such, when utilizing a pixel filter with three coefficients, the fourth co-efficient is set to zero. In one embodiment, depending on the number of data elements within the source data storage device 404, the source register 404 can be utilized as the destination data storage device or register, thereby reducing the number of registers than is generally necessary. As such, overwritten data within the source data storage device 404 may be reloaded from memory or from another register. In addition, multiple registers may be used as the source data storage device 404, with their respective data organized within the destination data storage device 406 as desired.

Once ordering of data elements, as well as coefficients is complete, the data and corresponding coefficients must be processed in accordance with a data processing operation. It is recognized by those skilled in the art that operations with different precisions are needed for filter calculation, as well as convolution calculation, utilizing different numbers of filter coefficients and data sizes. The most basic filter operation multiplies two pairs of numbers and adds their products. This operation is called a multiply-accumulate instruction.

Unfortunately, current computing architectures do not provide support for efficient multiply-accumulate calculations for multiple array or filter lengths and multiple data sizes utilizing either signed or unsigned co-efficients. In addition, byte operations are not supported. As a result, conventional computer architectures must convert 16 bit data using unpack instructions. These computer architectures generally include support for multiply-accumulate operations that compute the product of 16-bit data in separate registers and then add adjacent products to give a 32-bit result. This solution is acceptable for filter coefficients for data that require 16-bit precision, but for 8-bit filter coefficients, in 8 bit data (which is the general case for image and video), instructions and data level parallelism are wasted.

Figure 6:
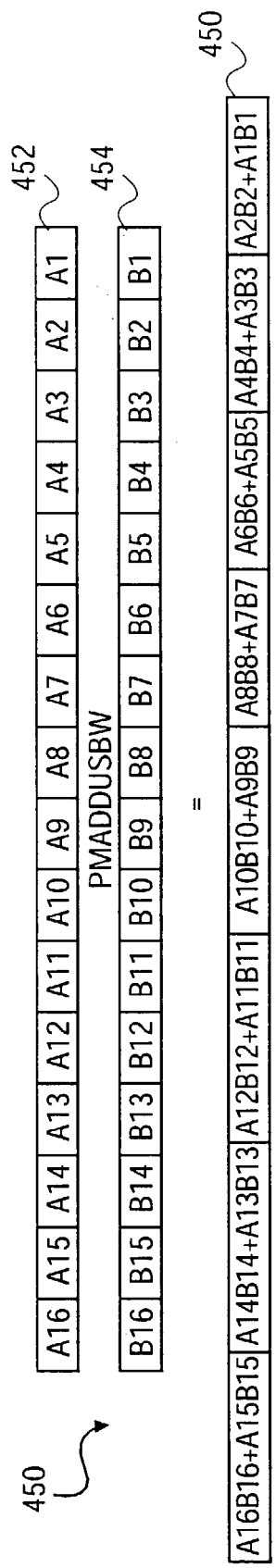
FIG. 6 depicts a block diagram illustrating a byte multiply-accumulate instruction in accordance with an embodiment of the present invention.

Referring now to FIG. 6, FIG. 6 depicts a first source register 452 and a second source register 454. In one embodiment, the first and second source registers are N-bit long SIMD registers, such as for example 128-bit Intel® SSE2 XMM registers. The multiply and accumulate instruction implemented on such a register would give the following results for two pixel vectors 452 and 454, which is stored within the destination register 456. Accordingly, the example shows an 8-bit byte to 16 word multiply-accumulate instruction called PMADDUSBW operation 147 (FIG. 1), in which the U and the S in the instruction mnemonically refer to unsigned and signed bytes. Bytes in one of the source registers are signed and in the other they are unsigned.

In one embodiment of the present invention, the register with the unsigned data is the destination and the 16 multiply-accumulate results. The reason for this choice is that in most implementations, data is unsigned and co-efficients are signed. Accordingly, it is preferable to overwrite the data because the data is less likely to be needed in future calculations. Additional byte multiply-accumulate instructions as depicted in FIG. 1 are PMADDUUBW operation 149 for unsigned bytes in both registers and PMADDSSBW operation 151 for signed bytes in both source registers. The multiply-accumulate instructions are completed by a PMADDWD instruction 153 that applies to pairs of 16-bit signed words to produce a 32-bit signed product.

As is generally the case of filtering operations, the second vector generally contains the filter co-efficients. Accordingly, to prepare an XMM register, the co-efficients can be loaded within a portion of the register and copied to the rest of the register using the shuffle instruction 145. For example, as depicted in FIG. 7A, a co-efficient data storage device 502, such as for example an XMM 128 bit register, is initially loaded with three co-efficients in response to execution of a data load instruction. However, those skilled in the art will recognize that filter co-efficients may be organized in memory prior to data processing. As such, the co-efficient may be initially loaded as depicted in FIG. 7B based on their organization within memory, prior to filtering.

As such, the co-efficient register 502 includes filter coefficients F3, F2 and F1, which can be coded as signed or unsigned bytes. Once the co-efficient register 502 is loaded, the existing instruction PSHUFD can be used to copy the filter co-efficients within the remaining portions of the co-efficient register to obtain the following result as depicted in FIG. 7B. As depicted in FIG. 7B, the co-efficient register 504 now includes shuffled co-efficients as required to perform a data processing operation in parallel. As known to those skilled in the art, filters including three co-efficients are very common in image processing algorithms. However, those skilled in the art will recognize that certain filtering operations, such as JPEG 2000 utilize nine and seven 16-bit co-efficients. Accordingly, processing of such co-efficient exceeds the capacity of co-efficient registers, resulting in a partially filtered result. Consequently, processing continues until a final result is obtained using each co-efficient.

Referring now to FIG. 7C, FIG. 7C illustrates the arrangement of pixel data within a source register 506 that was initially contained within the source register 404 as depicted in FIG. 5 and shuffled within the destination register 406. Accordingly, in response to execution of a data processing operation, the PMADDUSBW instruction can be used to compute the sum of the two multiplications with the result stored in the destination register 510. Unfortunately, in order to complete calculation and generate data processing results for the selected data processing operation, adjacent summed-product pairs within the destination register 510 must be added.

Accordingly, if the sum of a multiply-accumulate instruction is longer than two pixels, which is generally the case, the separate sums have to be added. Unfortunately, current computing architectures do not provide an efficient method of adding adjacent sums, due to the fact that the adjacent sums are within the same destination register. Accordingly, the present invention utilizes adjacent-add instructions, the results of which are depicted in FIGS. 8A-8D.

Referring now to FIG. 8A, FIG. 8A depicts a destination register 552 following adding of two adjacent 16 bit values (PADDD2WD operation 157) to give a 32 bit sum. As such, FIG. 8A depicts two adjacent 16 bit results of a multiply-accumulate instruction, which are added to give 32 bit sum of 4 byte products. FIG. 8B depicts an adjacent-add instruction (PAADDD4WD operation 157), which adds 4 adjacent 16-bit values to give a 32-bit sum. As such, 4 adjacent 16-bit results of a byte multiply-accumulate instruction are added to give 32-bit sum of 8 byte products. FIG. 8C illustrates an adjacent-add instruction (PAADD8WD operation 157), which adds 8 adjacent 16-bit values to give a 32-bit sum. As such, the example illustrates 8 adjacent 16-bit results of a byte multiply-accumulate operation, which are added to give a 32-bit sum of 16 byte products.

Accordingly, the selection of the instruction to perform an adjacent-add operation is based on the number of turns in a sum (N). For example, utilizing a three tap filter as depicted in FIGS. 7A-7C, a first instruction (PAADD2WD operation 157) will obtain the following result as depicted in FIG. 8D. However, for correlation between two 16 bit pixel vectors (for example, the first line of a macro block), the last instruction (PAADD8WD operation 157), as depicted in FIG. 8C, is utilized. Such an operation is becoming increasingly important for an efficient implementation as SIMD registers increase in size. Without such an operation, many additional instructions are required.

As such, the set of adjacent-add instructions, as described by the present invention, support a wide range of numbers of adjacent values which can be added and a full range of common data types. In one embodiment, addition of adjacent 16 bit values includes a set of instructions (PAADD-NWD operation 157) whose range begins with addition of two adjacent values (N=2) and doubles the number added to four (N=4) then to eight (N=8) and up to a total number in the register. The data size of the sum of 16 bit adjacent-additions is 32 bits. In an alternate embodiment, adjacent 16 bit values (PAADDWD operation 161) are added to yield a 32 bit sum.

In this alternate embodiment, no other instruction with the 16 bit data size is included because adjacent-add instructions with a 32 bit input are used to add the sum produced by the instruction with a 16 bit input. Both embodiments include a set of 32 bit adjacent-addition instructions (PAADDNDWD operation 159), whose range begins with the addition of two adjacent values (N=2) and doubles the number added to four (N=4), then eight (N=8), etc., up to the total number in the register. The data size of the sum of 32 bit adjacent-additions is 32 bits. In some cases, the results do not fill the register. For example, instructions as shown in FIGS. 8A, 8B and 8C, three different adjacent-adds yield 4, 2 and 1 32-bit results. In one embodiment, the results are stored in the lower, least significant parts of the destination data storage device.

Accordingly, when there are two 32-bit results, as depicted in FIG. 8B, the results are stored in the lower 64 bits. In the case of one 32-bit result, as illustrated in FIG. 8C, the results are stored in the lower 32 bits. As recognized by those skilled in the art, some applications utilize the sum of adjacent bytes. The present invention supports adjacent-addition of bytes with an instruction (PAADDNB operation 155) that adds two adjacent signed bytes giving a 16-bit word and an instruction that adds two adjacent unsigned bytes giving a 16-bit word result. Applications that require addition of more than two adjacent bytes add the 16-bit sum of two bytes with an appropriate 16 bit adjacent-add operation.

Once data processing operation results have been calculated, the next operation consists in routing the results back to a memory device. As illustrated by the embodiments described above, the results can be coded with a 32-bit precision. Therefore, results can be written back to memory using simple move operations acting on doublewords, for example, the MOVD operation 143 described above as well as Shift Right logical operations acting on the whole register (PSRLDQ), shift double quad-word right logical. As such, writing all results back to memory would need four MOVD and three PSRLDQ in the first case (FIG. 8A), two MOVD and one PSRLDQ in the second case (FIG. 8B) and finally, just one MOVD in the final case, as depicted in FIG. 8C.

Unfortunately, although the adjacent-add operations, as depicted in FIG. 7C, can be performed in parallel, filtering computations generally require the next pixel in the image. As such, one or more pixels need to be loaded in a source data storage device or register. In order to avoid loading the eight pixels each time in the registers, two solutions are proposed for this operation. In one embodiment, the present invention describes a register merge operation 163, as depicted in FIG. 9A. As such, in order to process pixels A1-A8 within a destination register 606, pixels A7-A1 are concatenated with pixel A8 to form pixels A8-A1 in destination register 606. Accordingly, the register merge operation utilizes the number of bytes to select registers, which is provided by an input argument.

Referring now to FIG. 9B, FIG. 9B depicts an alternate embodiment for performance of the register merge operation. Initially, eight pixels are loaded into a first source register 608 (MM0). Next, a subsequent eight pixels are loaded in a second source register (MM1) 610. Next, a permute operation is performed on the second source register 610. Once performed, register 610 is copied to a third source register (MM2) 612. Next, the first source register 608 is right-shifted by eight bits. In addition, the second source register 610 and a mask register 614 are combined in accordance with a packed logical AND instruction and stored within the first source register 608.

Next, a logical OR operation is performed between the second source register 610 and the first source register 608 to produce the following result within the destination register 620, resulting in the register merge operation. The process continues as illustrated by shifting the first source register 608. Next, the second source register 610 is shifted to yield the register 612. Next, a logical AND operation is performed between the mask register 614 and the second source register 612, with the results stored in a destination register 622. Finally, a packed OR operation is performed between the second source register 612 and the first source register 608 to yield a subsequent register merge operation within the destination register 624. Procedural methods for implementing the teachings of the present invention are now described.

Operation

Figure 10:
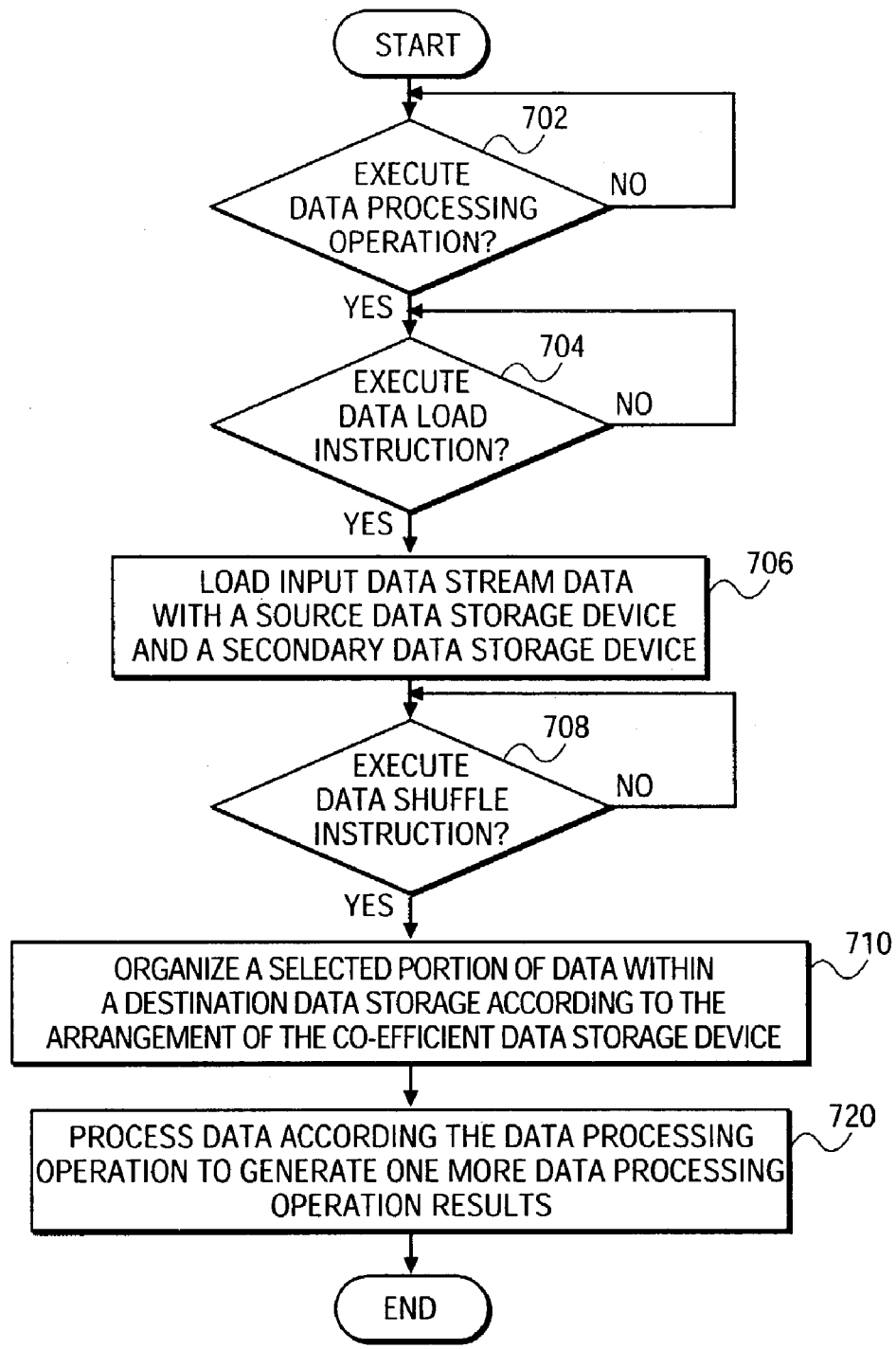
FIG. 10 depicts a block diagram illustrating a flowchart for efficient data processing of content data in accordance with one embodiment of the present invention.

Referring now to FIG. 10, FIG. 10 depicts a block diagram illustrating a method 700 for efficient filtering and convolution of content data within, for example, the computer system 100 as depicted in FIGS. 1 and 2. As described herein, content data refers to image, audio, video and speech data. In addition, the present invention refers to data storage devices, which as recognized by those skilled in the art, include various devices capable of storing digital data including, for example, data registers such as 128-bit Intel® architecture SSE2 MMX registers.

Referring again to FIG. 10, the method begins at process block 702, wherein it is determined whether a data processing operation is executed. As described herein, the data processing operation includes, but it is not limited to, convolution and filtering operations performed on pixel data. Once executed process block 704 is performed. At process block 704, a data load instruction is executed. In the response to execution of the data load instruction, at process block 706 input data stream data is loaded within a source data storage device 212A and a secondary data storage device 212B, for example as depicted in FIG. 2.

At process block 708, it is determined whether the data processing operation has executed a data shuffle instruction. In response to executing a data shuffle instruction, at process block 710, a selected portion of data from, for example, a source data storage device 212B is organized within a destination data storage device or according to an arrangement of co-efficients within a co-efficient data storage device (see FIG. 5). Co-efficients within a co-efficient data storage device are organized according to the desired data processing operation calculations (for example, as illustrated in FIGS. 7A and 7B). In one embodiment, co-efficients are organized within memory prior to any filtering operations. Accordingly, co-efficients may be loaded in a co-efficient data storage without the need for shuffling (see FIG. 7B).

As described above, ordering data and co-efficients is required to implement parallel calculations, as required by the data processing operation, as depicted in FIGS. 7A-7C. However, since the co-efficients are known prior to the data processing operation, co-efficients may be organized in memory, to enable loading into a co-efficient register as organized within memory without the need to shuffle the co-efficients during the data processing operation. Finally, at process block 720, the loaded data is processed according to the data processing operation to generate one or more data processing results. Once generated, the data processing operation results can be written back to memory.

Figure 11:
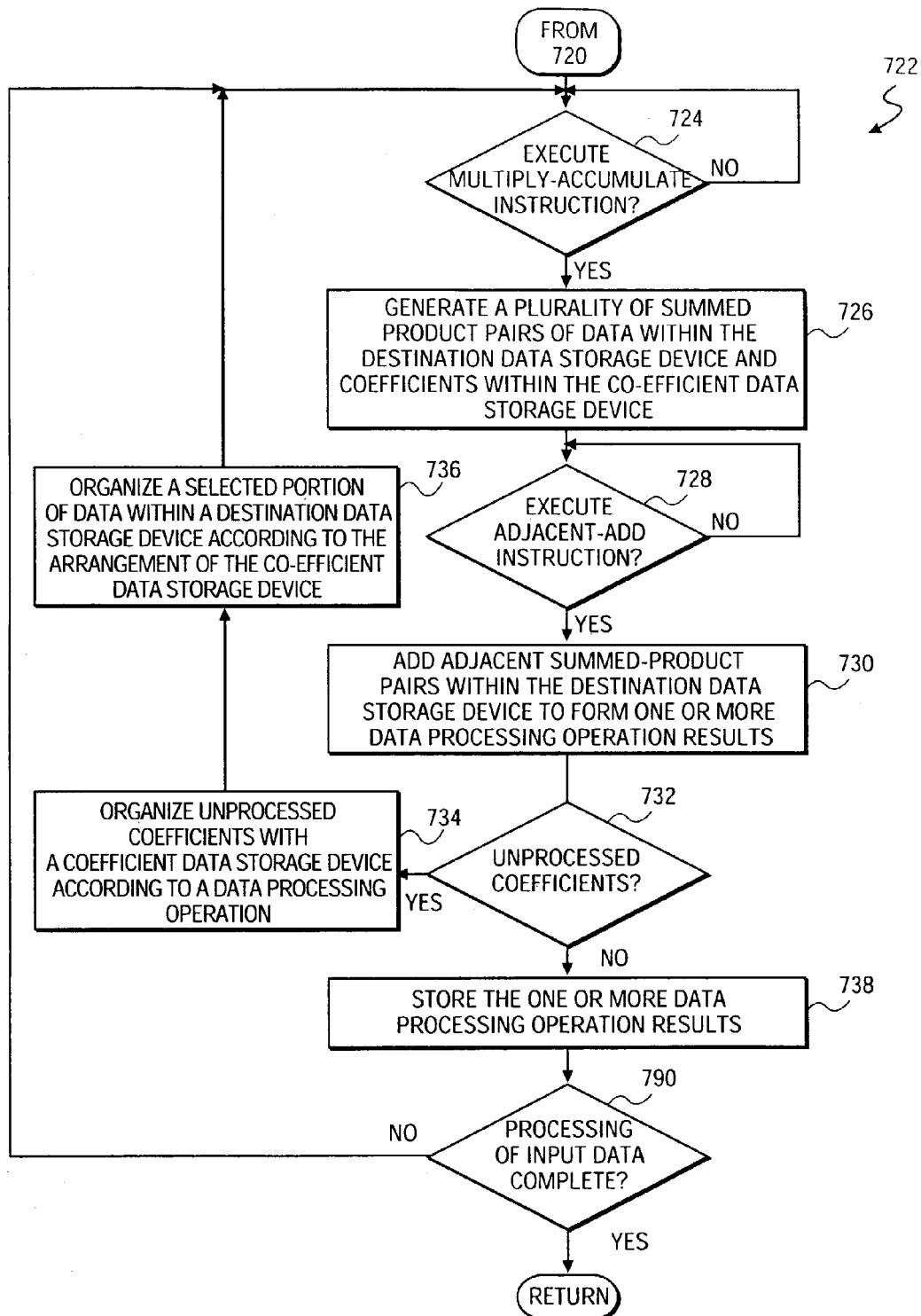
FIG. 11 depicts a block diagram illustrating an additional method for processing content data according to a data processing operation in accordance with a further embodiment of the present invention.

Referring now to FIG. 11, FIG. 11 depicts a block diagram illustrating a method 722 for processing data according to the data processing operation. At process block 724, it is determined whether the data processing operation has executed a multiply-accumulate instruction. In response to execution of the multiply-accumulate instruction, at process block 726, a plurality of summed-product pairs of data within the destination storage device and co-efficients within the co-efficient data storage device are generated, as depicted in FIG. 7C. Next, at process block 728, it is determined whether the data processing operation has executed an adjacent-add instruction.

In response to execution of the adjacent-add, at process block 730, adjacent summed-product pairs within the destination data storage device 510 (FIG. 7C) are added in response to execution of the adjacent-add instruction to form one or more data processing operation results (see FIG. 8D). However, in certain embodiments, where the number of co-efficients exceeds a capacity of the co-efficient register (see process block 732), partial data processing results are obtained. Consequently, processing and organizing of co-efficients (process block 734) data (process block 736) and continues until final data processing operation results are obtained, as indicated in optional process blocks 732-736.

Otherwise, at process block 738, the one or more data processing operation results are stored. Finally, at process block 790, it is determined whether processing of input data stream data is complete. As such, process blocks 724-732 are repeated until processing of input data stream data is complete. Once processing is complete, control flow returns to process block 720, wherein the method 700 terminates.

Figure 12:
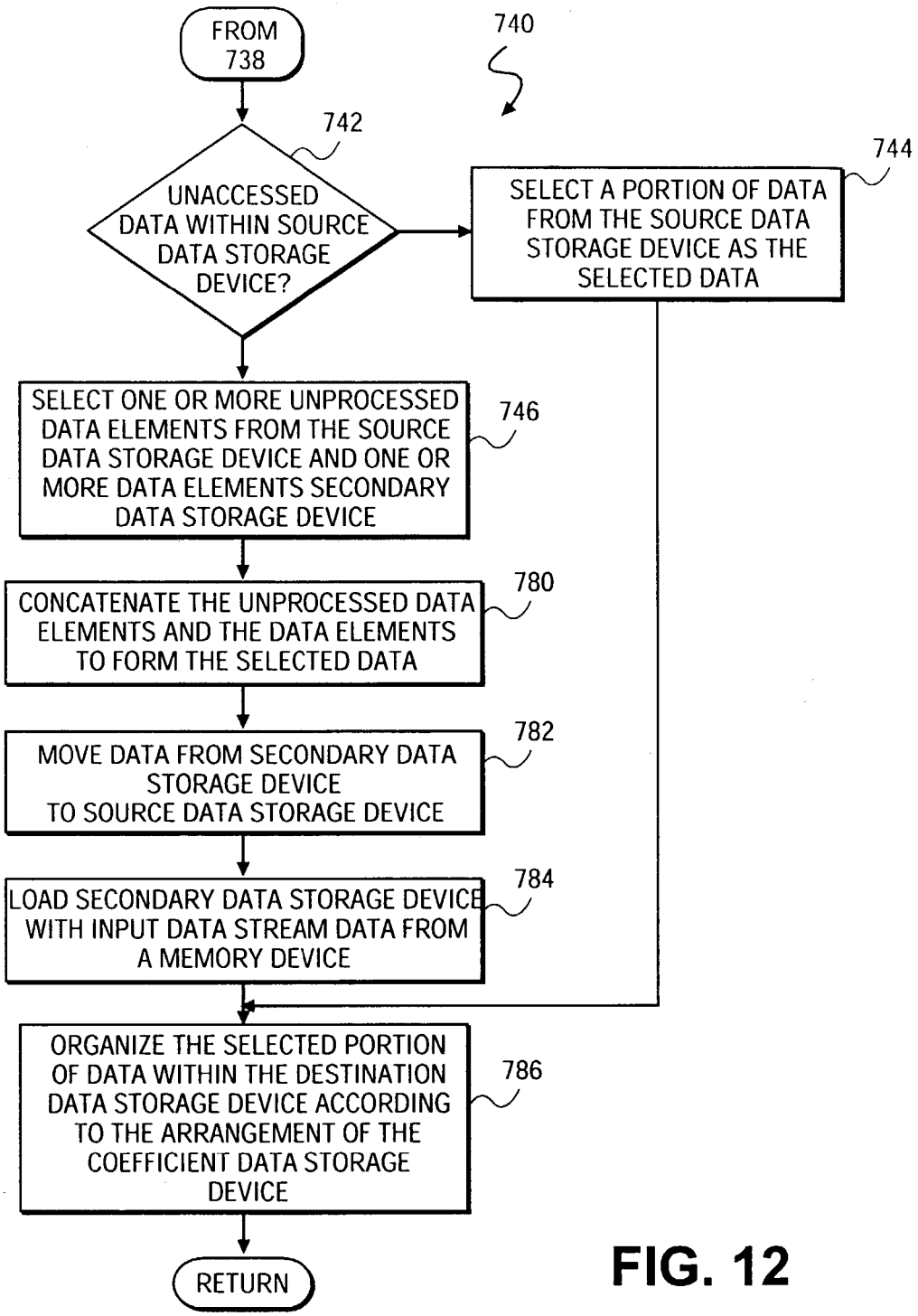
FIG. 12 depicts a block diagram illustrating a flowchart for continued processing of content data in accordance with a further embodiment of the present invention.

Referring now to FIG. 12, FIG. 12 depicts a block diagram illustrating an additional method 740 for processing additional input data. At process block 742, it is determined whether there is any unaccessed data within the source data storage device 212A. As described herein, unaccessed data refers to data within the source data storage device 212A that has not been shuffled within the data storage device in order to perform a multiply-accumulate instruction. When the data storage device contains unaccessed data, at process block 744, a portion of data is selected from the source data storage device as the selected data. Once selected, process block 786 is performed.

Otherwise, at process block 746, one or more unprocessed data elements are selected from the source data storage device, as well as one or more data elements from a secondary data storage device. As described herein, unprocessed data elements refer to data elements for which a data processing operation result has not yet been calculated. Next, at process block 780, a register merger instruction (see FIGS. 9A and 9B) is performed which concatenates the unprocessed data elements of the source data storage device with the data elements selected from the secondary data storage device to form the selected data. Next, at process block 782, data from the secondary data storage device is moved to the source data storage device.

As such, the source data storage device data is no longer required, since it has all been accessed. Accordingly, the secondary storage of data, which contains unaccessed data, can be used to overwrite data within the source data storage device. At process block 784, the secondary data storage device is loaded with input data stream data from a memory device, which requires additional data processing, such as filtering or convolution. Finally, at process block 786, the selected data is organized within a destination data storage device or according to the arrangement of co-efficients within the co-efficient data storage device (see FIG. 5). Once performed, control flow returns to process block 790, as depicted in FIG. 11 for continued processing of the selected data.

Figure 13:
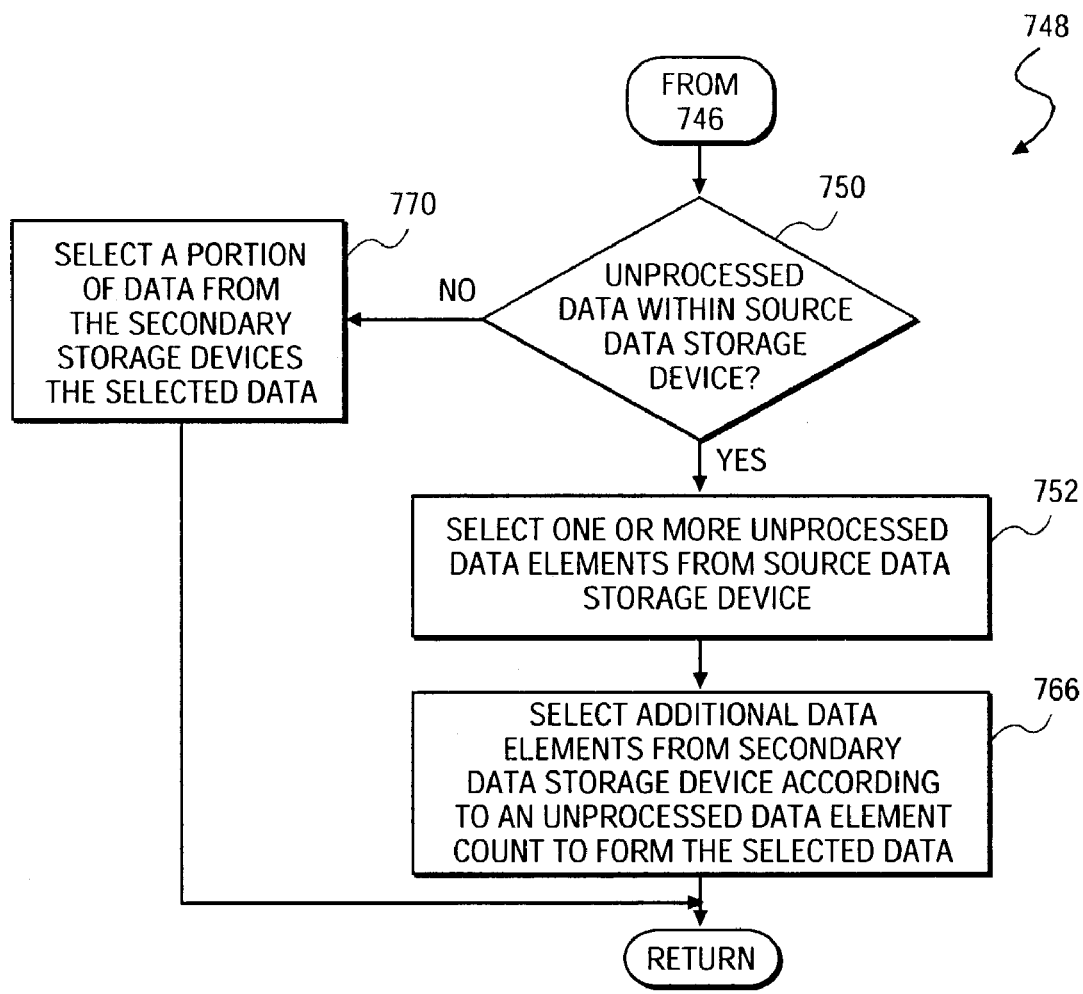
FIG. 13 depicts a block diagram illustrating a flowchart illustrating a register merge operation in accordance with a further embodiment of the present invention.

Referring now to FIG. 13, FIG. 13 depicts an additional method 748 for selecting unprocessed data elements. At process block 750, it is determined whether the source data storage device contains unprocessed data. When each portion of data within the source data storage device has been processed, process block 770 is performed. At process block 770, a portion of data is selected from the secondary data storage device, which functions as the selected data, which is then processed in accordance with the data processing operation.

Otherwise, at process block 752, one or more unprocessed data elements are selected from the source data storage device. Finally, at process block 766, additional data elements are selected from the secondary data storage device according to a count of the unprocessed data elements to form the selected data. As such, data selected for shuffling within a destination data storage device prior to performing of the data processing operation is limited to a count of data elements based on the number of filter co-efficients. Accordingly, using this data element count, the number of unprocessed data elements is subtracted from the data element count in order to determine the number of elements to select from the secondary data storage device in order to perform the register merge operation.

Figure 14:
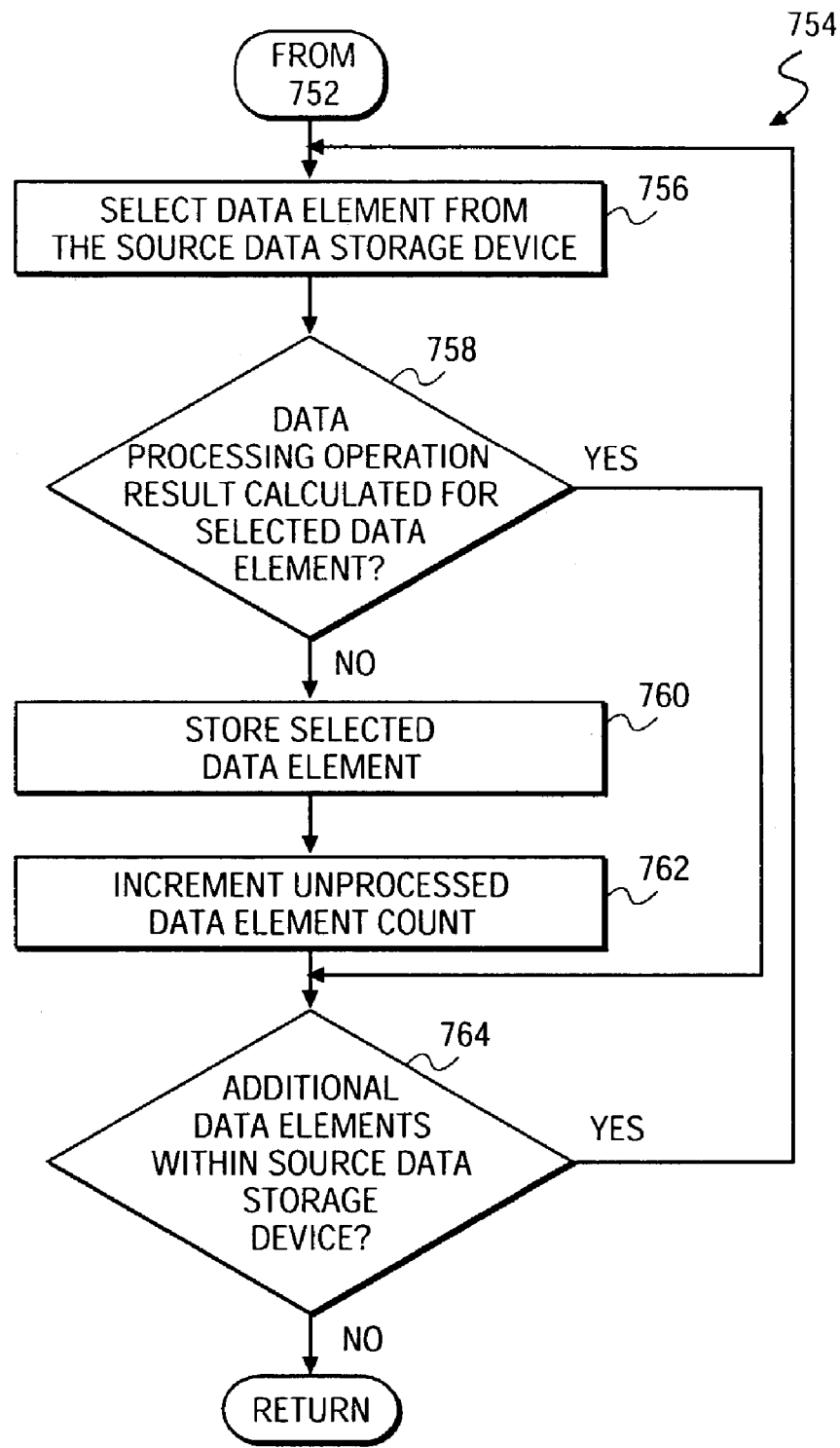
FIG. 14 depicts a flowchart illustrating an additional method for selecting unprocessed data elements from a source data storage device in accordance with an exemplary embodiment of the present invention.

Finally, referring to FIG. 14, FIG. 14 depicts an additional method 754 for selecting unprocessed data elements of process block 752, as depicted in FIG. 13. At process block 756, a data element is selected from the source data storage device. Next, at process block 758, it is determined whether a data processing operation result has been calculated for the data element. When such a result has been calculated, the selected data element is discarded. Otherwise, at process block 760, the selected data element is an unprocessed data element and is stored. Next, at process block 762, an unprocessed data element count is incremented. Finally, at process block 764, process blocks 756-762 are repeated until each data element within the source data storage device is processed.

As such, utilizing the teachings of the present invention, unnecessary data type changes are avoided, resulting in a maximization of the number of SIMD operations per instructions. In addition, a significant reduction in the number of clock cycles required to order data for arithmetic operations is also achieved. Accordingly, Table 1 gives estimates speed-up values for several filtering applications using the teachings and instructions described by the present invention.

TABLE 1

| Operation | Speedup |
|---|---|
| 9-7 wavelet | 1.7 |
| 3 × 3 filter with byte co-efficients | 4.3 |
| watermark correlation | 6.8 |

Alternate Embodiments

Several aspects of one implementation of the computing architecture for providing efficient filtering and convolution of content data using SIMD registers have been described. However, various implementations of the computing architecture provide numerous features including, complementing, supplementing, and/or replacing the features described above. Features can be implemented as part of the computing architecture or as part of specific software or hardware components in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a system for efficient filtering and convolution of content data using SIMD registers, it will be appreciated by those skilled in the art that the teaching of the present invention can be applied to other systems. In fact, systems for processing image, audio and video data are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

Embodiments of the present invention provides many advantages over known techniques. The present invention includes the ability to efficiently implement operations for filtering/convolution for multiple array lengths and data sizes and co-efficient signs. These operations are accomplished by using a few instructions that are a part of a small group of single instruction multiple data (SIMD) instructions. Accordingly, the present invention avoids unnecessary data type changes. As a result, by avoiding unnecessary data type changes, the present invention maximizes the number of SIMD operations per instruction, while significantly reducing the number of clock cycles required to order data for arithmetic operations such as multiply-accumulate operations.

Figure 15:
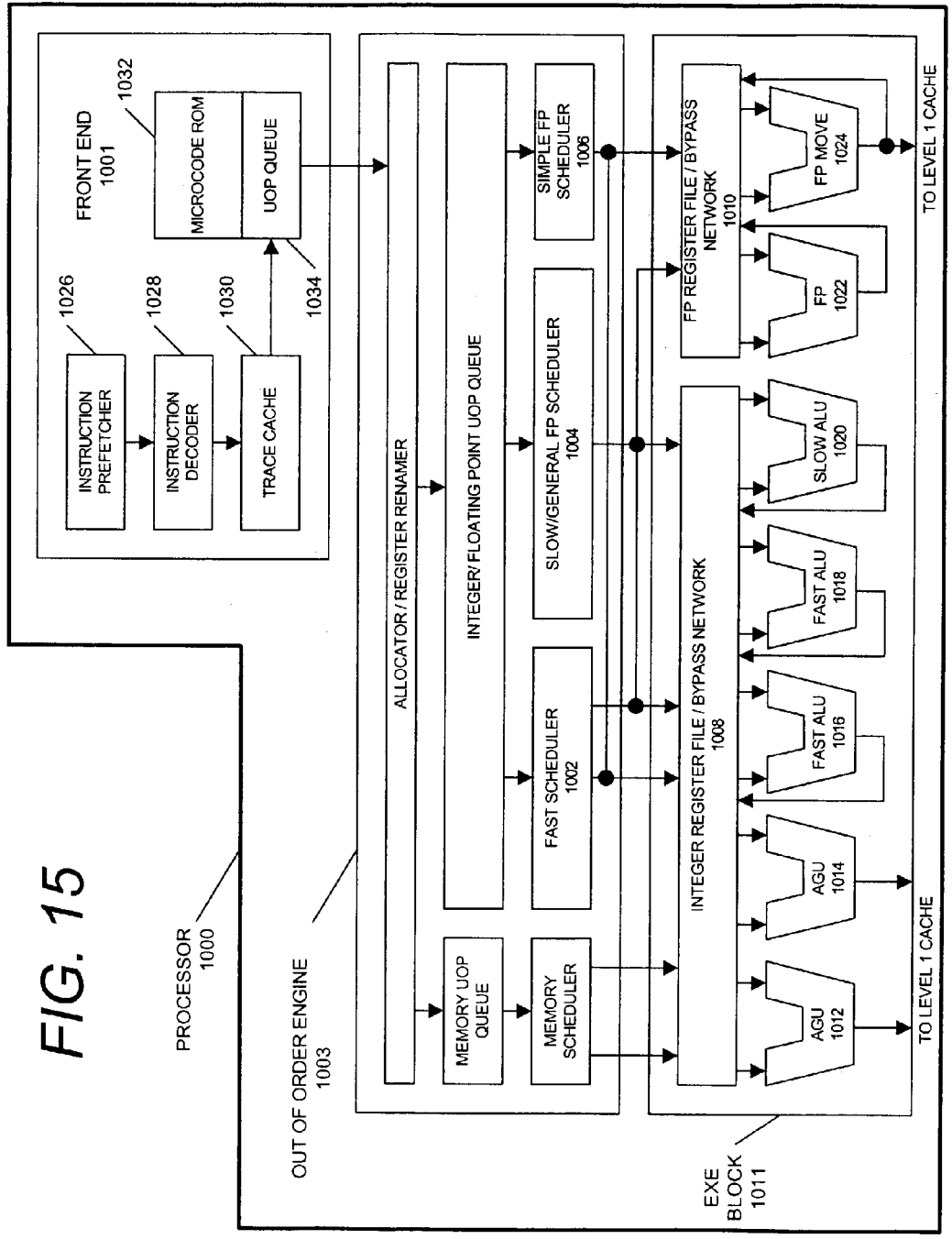
FIG. 15 is a block diagram of the micro-architecture for a processor of one embodiment that includes logic circuits to perform parallel shift right merge operations in accordance with the present invention.

FIG. 15 is a block diagram of the micro-architecture for a processor of one embodiment that includes logic circuits to perform parallel shift right merge operations in accordance with the present invention. The shift right merge operation may also be referred to as a register merge operation and register merge instruction as in the discussion above. For one embodiment of the shift right merge instruction (PSRMRG), the instruction produces the same results as the register merge operation 167 of FIGS. 1, 9A and 9B. The in-order front end 1001 is the part of the processor 1000 that fetches the macro-instructions to be executed and prepares them to be used later in the processor pipeline. The front end of this embodiment includes several units. The instruction prefetcher 1026 fetches macro-instructions from memory and feeds them to an instruction decoder 1028 which in turn decodes them into primitives called micro-instructions or micro-operations (also called micro op or uops) that the machine know how to execute. The trace cache 1030 takes decoded uops and assembles them into program ordered sequences or traces in the uop queue 1034 for execution. When the trace cache 1030 encounters a complex macro-instruction, the microcode ROM 1032 provides the uops needed to complete the operation.

Many macro-instructions are converted into a single micro-op, and others need several micro-ops to complete the full operation. In this embodiment, if more than four micro-ops are needed to complete a macro-instruction, the decoder 1028 accesses the microcode ROM 1032 to do the macro-instruction. In one embodiment, an instruction for a parallel shift right merge algorithm can be stored within the microcode ROM 1032 should a number of micro-ops be needed to accomplish the operation. The trace cache 1030 refers to a entry point programmable logic array (PLA) to determine a correct micro-instruction pointer for reading the micro-code sequences for the divide algorithms in the micro-code ROM 1032. After the microcode ROM 1032 finishes sequencing micro-ops for the current macro-instruction, the front end 1001 of the machine resumes fetching micro-ops from the trace cache 1030.

Some SIMD and other multimedia types of instructions are considered complex instructions. Most floating point related instructions are also complex instructions. As such, when the instruction decoder 1028 encounters a complex macro-instruction, the microcode ROM 1032 is accessed at the appropriate location to retrieve the microcode sequence for that macro-instruction. The various micro-ops needed for performing that macro-instruction are communicated to the out-of-order execution engine 1003 for execution at the appropriate integer and floating point execution units.

The out-of-order execution engine 1003 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of this embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of this embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of this embodiment is comprised of a number of execution units: address generation unit (AGU) 1012, AGU 1014, fast ALU 1016, fast ALU 1018, slow ALU 1020, floating point ALU 1022, floating point move unit 1024. For this embodiment, the floating point execution blocks 1022, 1024, execute floating point, MMX, SIMD, and SSE operations. The floating point ALU 322 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 1016, 1018. The fast ALUs 1016, 1018, of this embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For this embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In this embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for extended precision integer divide operations.

The term "registers" is used herein to refer to the on-board processor storage locations that are used as part of macro-instructions to identify operands. In other words, the registers referred to herein are those that are visible from the outside of the processor (from a programmer's perspective). However, the registers described herein can be implemented by circuitry within a processor using any number of different techniques, such as dedicated physical registers, dynamically allocated physical registers using register renaming, combinations of dedicated and dynamically allocated physical registers, etc. For the discussions below, the registers are understood to be data registers designed to hold packed data, such as 64 bits wide MMX™ registers (mm registers) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2 technology can also be used to hold such packed data operands.

In the examples of the following figures, a number of data operands are described. For simplicity, the data segments are labeled from letter A onwards alphabetically, wherein A is located at the lowest address and Z would be located at the highest address. Thus, A may be at address 0, B at address 1, C at address 3, and so on. Although the data sequences in some of the examples appear with the letters arranged in reverse alphabetic order, the addressing would still start with A at 0, B at 1, etc. Conceptually, a shift right operation, as in the shift right merge for one embodiment, entails right shifting the lower address data segments out if the sequence is D, C, B, A. Thus, a right shift simply shifts the data elements of a data block to the right past a stationary line. Furthermore, a shift right merge operation can conceptually right shift the rightmost data segments from one operand into the left side of another data operand as if the two operands were on a continuum.

Figure 16A:
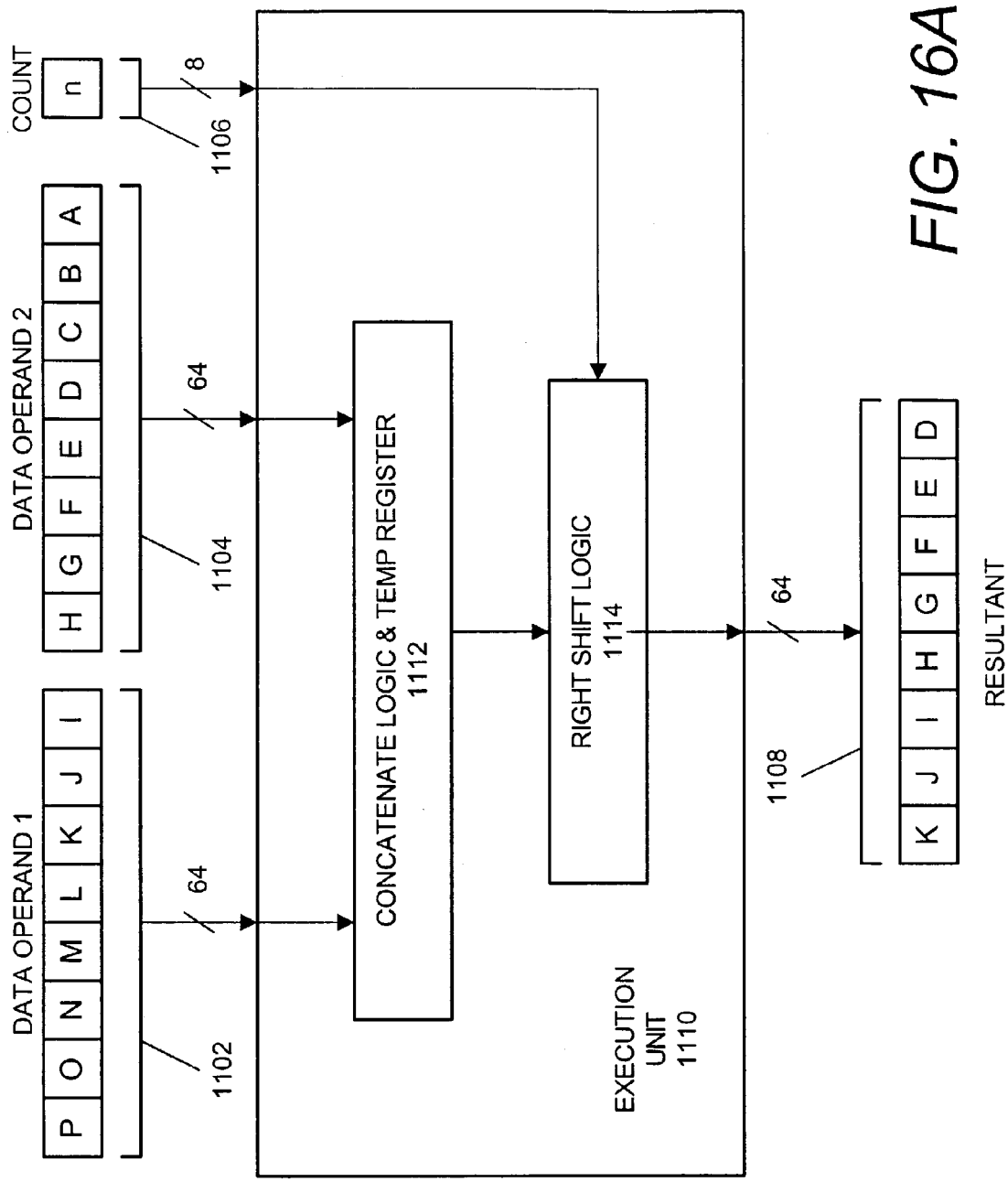
FIG. 16A is a block diagram of one embodiment of logic to perform a parallel shift right merge operation on data operands in accordance with the present invention.

FIG. 16A is a block diagram of one embodiment of logic to perform a parallel shift right merge operation on data operands in accordance with the present invention. The instruction (PSRMRG) for a shift right merge (also, a register shift) operation of this embodiment begins with three pieces of information: a first data operand 1102, a second data operand 1104, and a shift count 1106. In one embodiment, the shift PSRMRG instruction is decoded into one micro-operation. In an alternate embodiment, the instruction may be decoded into a various number of micro-ops to perform the shift merge operation on the data operands. For this example, the data operands 1102, 1104, are 64 bit wide pieces of data stored in a register/memory and the shift count 1106 is an 8 bit wide immediate value. Depending on the particular implementation, the data operands and shift count can be other widths such as 128/256 bits and 16 bits, respectively. The first operand 1102 in this example is comprised of eight data segments: P, O, N, M, L, K, J, and I. The second operand 1104 is also comprised of eight data segments: H, G, F, E, D, C, B, and A. The data segments here are of equal length and each comprise of a single byte (8 bits) of data. However, another embodiment of the present invention operates with longer 128 bit operands wherein the data segments are comprised of a single byte (8 bits) each and the 128 bit wide operand would have sixteen byte wide data segments. Similarly, if each data segment was a double word (32 bits) or a quad word (64 bits), the 128 bit operand would have four double word wide or two quad word wide data segments, respectively. Thus embodiments of the present invention are not restricted to particular length data operands, data segments, or shift counts, and can be sized appropriately for each implementation.

The operands 1102, 1104 can reside either in a register or a memory location or a register file or a mix. The data operands 1102, 1104, and the count 1106 are sent to an execution unit 1110 in the processor along with a shift right merge instruction. By the time the shift right merge instruction reaches the execution unit 1110, the instruction should have been decoded earlier in the processor pipeline. Thus the shift right merge instruction can be in the form of a micro operation (uop) or some other decoded format. For this embodiment, the two data operands 1102, 1104, are received at concatenate logic and a temporary register. The concatenate logic merges/joins the data segments for the two operands and places the new block of data in a temporary register. Here, the new data block is comprised of sixteen data segments: P, O, N, M, L, K, J, I, H, G, F, E, D, C, B, A. As this example is working with 64 bits wide operands, the temporary register need to hold the combined data is 128 bits wide. For 128 bits wide data operands, a 256 bits wide temporary register is needed.

Right shift logic 1114 in the execution unit 1110 takes the contents of the temporary register and performs a logical shift right of the data block by n data segments as requested by the count 1106. In this embodiment, the count 1106 indicates the number of bytes to right shift. Depending on the particular implementation, the count 1106 can also be used to indicated the number of bits, nibbles, words, double words, quad words, etc. to shift, depending on the granularity of the data segments. For this example, n is equal to 3, so the temporary register contents are shifted by three bytes. If each data segment was a word or double word wide, then the count can indicate the number of words or double words to shift, respectively. For this embodiment, 0's are shifted in from the left side of the temporary register to fill up the vacated spaces as the data in the register is shifted right. Thus if the shift count 1106 is greater than the number of data segments in a data operand (eight in this case), one or more 0's can appear in the resultant 1108. Furthermore, if the shift count 1106 is equal to or exceeds the total number of data segments for both operands, the resultant will comprise of all 0's, as all the data segments will have been shifted away. The right shift logic 1114 outputs the appropriate number of data segments from the temporary register as the resultant 1108. In another embodiment, an output multiplexer or latch can be included after the right shift logic to output the resultant. For this example, the resultant is 64 bits wide and includes eight bytes. Due to the shift right merge operation on the two data operands 1102, 1104, the resultant is comprised of the following eight data segments: K, J, I, H, G, F, E, and D.

Figure 16B:
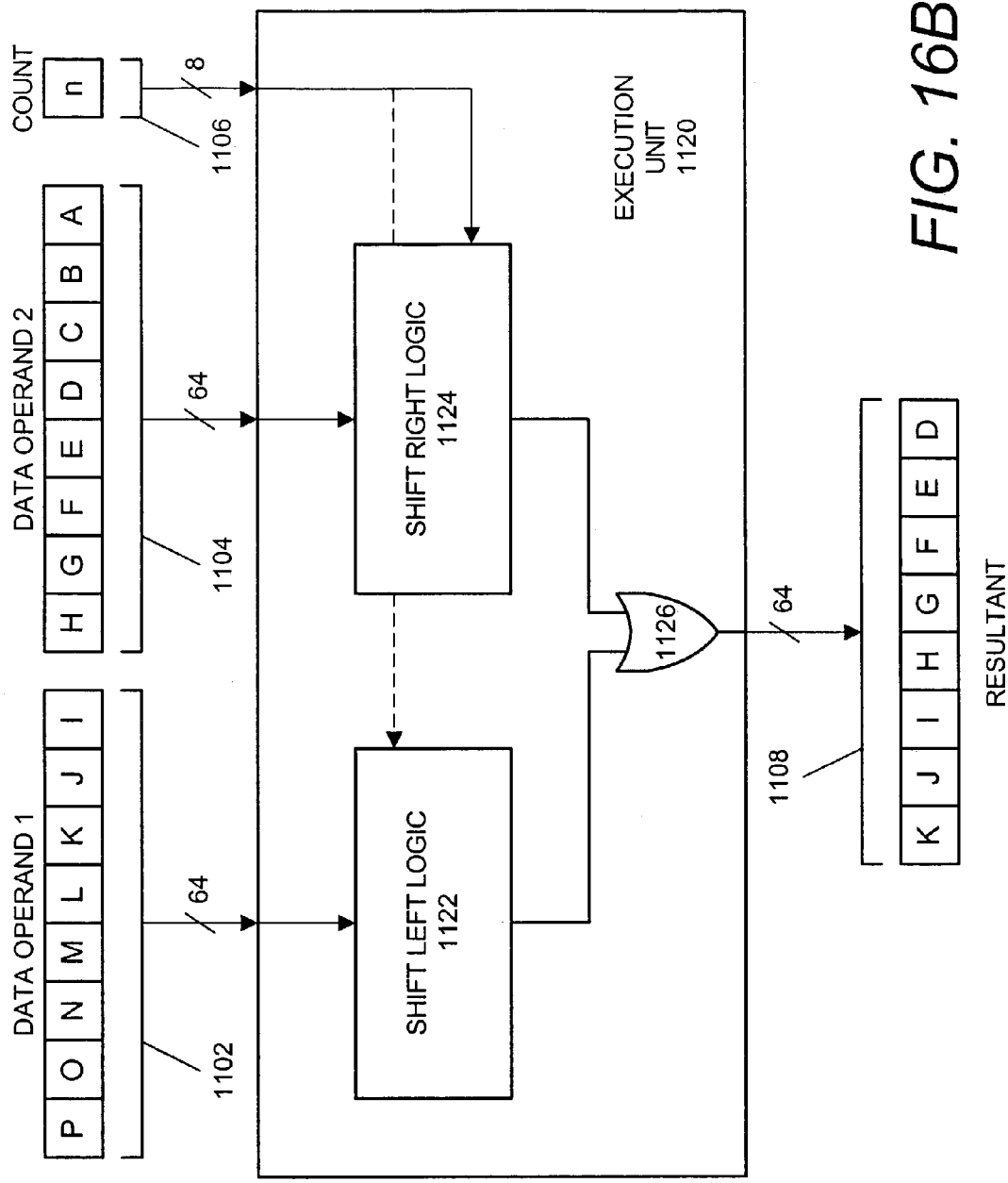
FIG. 16B is a block diagram of another embodiment of logic to perform a shift right merge operation.

FIG. 16B is a block diagram of another embodiment of logic to perform a shift right merge operation. Like the previous example of FIG. 16A, the shift right merge operation of this embodiment begins with three pieces of information: a first 64 bits wide data operand 1102, a second 64 bits wide data operand 1104, and a 8 bits wide shift count 1106. The shift count 1106 indicates how many places to shift the data segments. For this embodiment, the count 1106 is stated in number of bytes. In an alternate embodiment, the count may indicate the number of bits, nibbles, words, double words, or quad words to shift the data. The first and second operands 1102 in this example are each comprised of eight equal length, byte size data segments (H, G, F, E, D, C, B, A) and the second operand 1104 is comprised of eight data segments (P, O, N, M, L, K, J, I). The count n is equal to 3. Another embodiment of the invention can operate with alternative length operands and data segments, such as 128/256/512 bits wide operands and bit/byte/word/double word/quad word sized data segments and 8/16/32 bits wide shift counts. Thus embodiments of the present invention are not restricted to particular length data operands, data segments, or shift counts, and can be sized appropriately for each implementation.

The data operands 1102, 1104, and the count 1106 are sent to an execution unit 1120 in the processor along with a shift right merge instruction. For this embodiment, the first data operand 1102 and the second data operand 1104 are received at shift left logic 1122 and shift right logic 1124, respectively. The count 1106 is also sent to the shift logic 1122, 1124. The shift left logic 1122 shifts data segments for the first operand 1102 left by the "number of data segments in the first operand−n" number of segments. As the data segments are shifted left, 0's are shifted in from the right side to fill up the vacated spaces. In this case, there are eight data segments, so the first operand 1102 is shifted left by eight minus three, or five, places. The first operand 1102 is shifted by this different value to achieve the correct data alignment for merging at the logic OR gate 1126. After the left shift here, the first data operand becomes: K, J, I, 0, 0, 0, 0, 0. If the count 1106 is greater than the number of number of data segments in the operand, the shift left calculation can yield a negative number, indicating a negative left shift. A logical left shift with a negative count is interpreted as a shift in the negative direction and is essentially a logical right shift. A negative left shift will bring in 0's from the left side of the first operand 1102.

Similarly, the shift right logic 1124 shifts data segments for the second operand right by n number of segments. As the data segments are shifted right, 0's are shifted in from the left side to fill up the vacated spaces. The second data operand becomes: 0, 0, 0, H, G, F, E, D. The shifted operands are outputted from the shift left/right logic 1122, 1124, and merged together at the logic OR gate 1126. The OR gate performs a logical or-ing of the data segments and provides a 64 bits wide resultant 1108 of this embodiment. The or-ing together of "K, J, I, 0, 0, 0, 0, 0" with "0, 0, 0, H, G, F, E, D" generates a resultant 1108 comprising eight bytes: K, J, I, H, G, F, E, D. This result is the same as that for the first embodiment of the present invention in FIG. 16A. Note that for a count n 1106 greater than the number of data elements in an operand, the appropriate number of 0's can appear in the resultant starting on the left side.

Furthermore, if the count 1106 is greater than or equal to the total number of data elements in both operands, the resultant will comprise of all 0's.

Figure 17A:
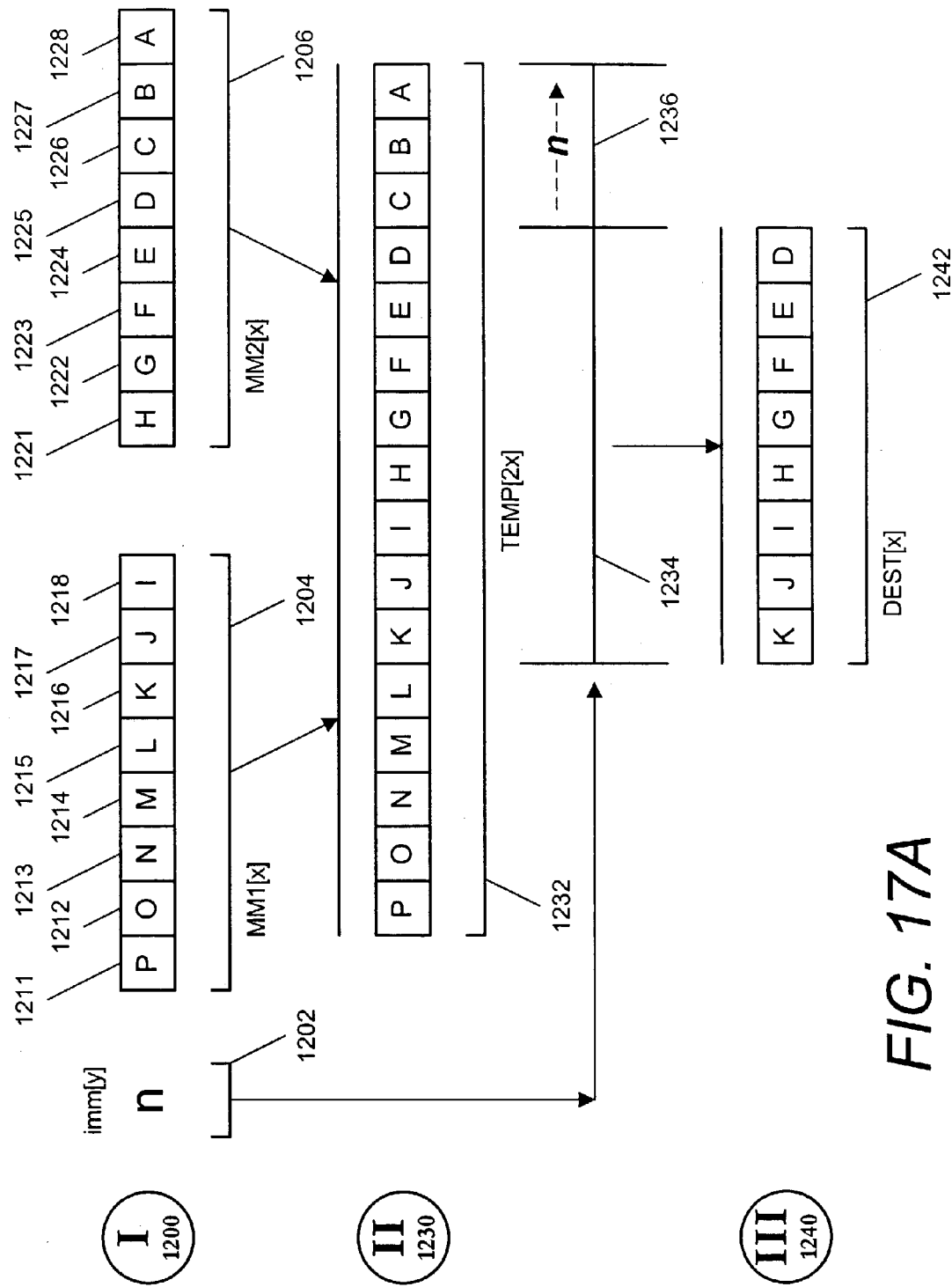
FIG. 17A illustrates the operation of a parallel shift right merge instruction in accordance with a first embodiment of the present invention.

FIG. 17A illustrates the operation of a parallel shift right merge instruction in accordance with a first embodiment of the present invention. For these discussions, MM1 1204, MM2 1206, TEMP 1232, and DEST 1242, are generally referred to as operands or data blocks, but are not restricted as such and also include registers, register files, and memory locations. In one embodiment MM1 1204 and MM2 1206 are 64 bits wide MMX registers (also referred to as 'mm' in some instances). At the state I 1200, a shift count imm[y] 1202, a first operand MM1[x] 1204, and a second operand MM2[x] 1206 are sent with the parallel shift right merge instruction. The count 1202 is an immediate value of y bits width. The first 1204 and second 1206 operands are data blocks including x data segments and having total widths of 8x bits each if each data segment is a byte (8 bits). The first 1204 and second 1206 operands are each packed with a number of smaller data segments. For this example, the first data operand MM1 1204 is comprised of eight equal length data segments: P 1211, O 1212, N 1213, M 1214, L 1215, K 1216, J 1217, I 1218. Similarly, the second data operand MM2 1206 is comprised of eight equal length data segments: H 1221, G 1222, F 1223, E 1224, D 1225, C 1226, B 1227, A 1228. Thus each of these data segments are 'x*8' bits wide. So if x is 8, each operand is 8 bytes or 64 bits wide. For other embodiments, a data element can be a nibble (4 bits), word (16 bits), double word (32 bits), quad word (64 bits), etc. In alternate embodiments, x can be 16, 32, 64, etc. data elements wide. The count y is equal to 8 for this embodiment and the immediate can be represented as a byte. For alternate embodiments, y can be 4, 16, 32, etc. bits wide. Furthermore, the count 1202 is not limited to an immediate value and can also be stored in a register or memory location.

The operands MM1 1204 and MM2 1206 are merged together at state II 1230 to form a temporary data block TEMP[2x] 1232 of 2x data elements (or bytes in this case) wide. The merged data 1232 of this example is comprised of sixteen data segments arranged as: P, O, N, M, L, K, J, I, H, G, F, E, D, C, B, and A. An eight byte wide window 1234 frames eight data segments of the temporary data block 1232, starting from the rightmost edge. Thus the right edge of the window 1234 would line up with the right edge of the data block 1232 such that the window 1234 frames data segments: H, G, F, E, D, C, B, and A. The shift count n 1202 indicates the desired amount to right shift the merged data. The count value can be implemented to state the shift amount in terms of bits, nibbles, bytes, words, double words, quad words, etc., or particular number of data segments. Based on the count value 1202, the data block 1232 is shifted right 1236 by n data segments here. For this example, n is equal to 3 and the data block 1232 is slid three places to the right. Another way of looking at this is to shift the window 1234 in the opposite direction. In other words, the window 1234 can be conceptually viewed as shifting three places to the left from the right edge of the temporary data block 1232. For one embodiment, if the shift count n is greater than the total number of data segments, 2x, present in the combined data block, the resultant would comprise of all '0's. Similarly, if the shift count n is greater than or equal to the number data segments, x, in an the first operand 1204, the resultant would include one or more '0's starting from the left side of the resultant. At state III 1240, the data segments (K, J, I, H, G, F, E, D) framed by the window 1234 is outputted as a resultant to an x data elements wide destination DEST[x] 1242.

Figure 17B:
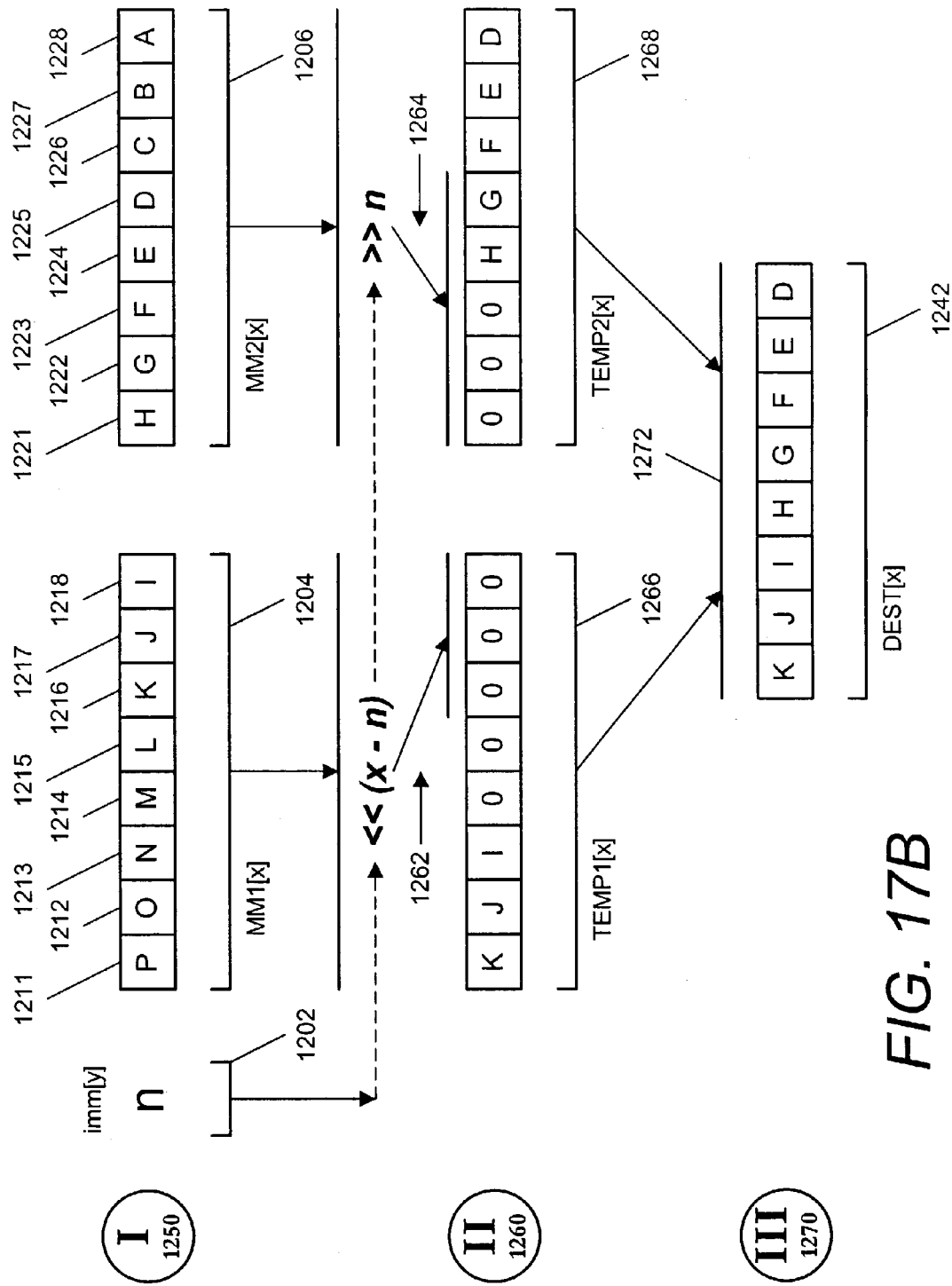
FIG. 17B illustrates the operation of a shift right merge instruction in accordance with a second embodiment.

FIG. 17B illustrates the operation of a shift right merge instruction in accordance with a second embodiment. The shift right merge instruction is accompanied at state I 1250 by a count imm[y] of y bits, a first data operand MM1 [x] of x data segments, and as second data operand MM2[x] of x data segments. As with the example of the FIG. 17A, y is equal to 8 and x is equal to 8, wherein MM1 and MM2 each being 64 bits or 8 bytes wide. The first 1204 and second 1206 of this embodiment are packed with a number of equally sized data segments, each a byte wide in this case, "P 1211, O 1212, N 1213, M 1214, L 1215, K 1216, J 1217, I 1218" and H 1221, G 1222, F 1223, E 1224, D 1225, C 1226, B 1227, A 1228", respectively.

At state II 1260, the shift count n 1202 is used to shift the first 1204 and second 1206 operands. The count of this embodiment indicates the number of data segments to right shift the merged data. For this embodiment, the shifting occurs before the merging of the first 1204 and second 1206 operands. As a result, the first operand 1204 is shifted differently. In this example, the first operand 1204 is shifted left by x minus n data segments. The "x–n" calculation allows for proper data alignment at later data merging. Thus for a count n of 3, the first operand 1204 is shifted to the left by five data segments or five bytes. There are 0's shifted in from the right side to fill the vacated spaces. But if shift count n 1202 is greater than the number of number of data segments x available in first operand 1204, the shift left calculation of "x–n" can yield a negative number, which in essence indicates a negative left shift. In one embodiment, a logical left shift with a negative count is interpreted as a left shift in the negative direction and is essentially a logical right shift. A negative left shift will bring in 0's from the left side of the first operand 1204. Similarly, the second operand 1206 is shifted right by the shift count of 3 and 0's are shifted in from the left side to fill the vacancies. The shifted results are held for the first 1204 and second 1206 operands are stored in x data segments wide registers TEMP1 1266 and TEMP2 1268, respectively. The shifted results from TEMP1 1266 and TEMP2 1268 are merged together 1272 to generate the desired shift merged data at register DEST 1242 at state III 1270. If shift count n 1202 is greater than x, the operand can contain one or more 0's in the resultant from the left side. Furthermore, if shift count n 1202 is equal to 2x or greater, the resultant in DEST 1242 will comprise of all 0's.

In the above examples, such as in FIGS. 17A and 17B, one or both MM1 and MM2 can be 64 bits data registers in a processor enabled with MMX/SSE technology or 128 bits data registers with SSE2 technology. Depending on the implementation, these registers can be 64/128/256 bits wide. Similarly, one or both of MM1 and MM2 can be memory locations other than a register. In the processor architecture of one embodiment, MM1 and MM2 are source operands to a shift right merge instruction (PSRMRG) as described above. The shift count IMM is also an immediate to such a PSRMRG instruction. For one embodiment, the destination for the resultant, DEST, is also a MMX or XMM data register. Furthermore, DEST may be the same register as one of the source operands. For instance, in one architecture, a PSRMRG instruction has a first source operand MM1 and a second source operand MM2. The predefined destination for the resultant can be the register for the first source operand, MM1 in this case.

FIG. 18A is a flow chart illustrating one embodiment of a method to shift right and merge data operands in parallel.

The length values of L is generally used here to represent the width of the operands and data blocks. Depending on the particular embodiment, L can be used to designate the width in terms of number of data segments, bits, bytes, words, etc. At block 1302, a first length L data operand is received for use with the execution of a shift merge operation. A second length L data operand for the shift merge operation is also received at block 1304. A shift count to indicated how many data segments or distance, in bits/nibbles/bytes/words/double words/quad words, is received at block 1306. Execution logic at block 1308 concatenates the first operand and the second operand together. For one embodiment, a temporary length 2L register holds the concatenated data block. In an alternated embodiment, the merged data is held in a memory location. At block 1310, the concatenated data block is shifted right by the shift count. If the count is expressed as a data segment count, then the data block is shifted right by that many data segments and 0's are shifted in from the left along the most significant end of the data block to fill the vacancies. If the count is expressed in bits or bytes, for example, the data block is similarly right shifted by that distance. At block 1312, a length L resultant is generated from the right hand side or least significant end of the shifted data block. For one embodiment, the length L amount of data segments are muxed from the shifted data block to a destination register or memory location.

FIG. 18B is a flow chart illustrating another embodiment of a method to shift right and merge data. A first length L data operand is received for processing with a shift right and merge operation at block 1352. A second length L data operand is received at block 1354. At block 1356, a shift count to indicate the desired right shift distance. The first data operand is shifted left at block 1358 based on a calculation with the shift count. The calculation of one embodiment comprises subtracting the shift count from L. For instance, if operand length L and shift count are in terms of data segments, then the first operand is shifted left by "L−shift count" segments, with 0's shifting in from the least significant end of the operand. Similarly, if L is expressed in bits and the count is in bytes, the first operand would be shifted left by "L−shift count*8" bits. The second data operand is shifted right at block 1360 by the shift count and 0's shifted in from the most significant end of the second operand to fill vacancies. At block 1362, the shifted first operand and the shifted second operand are merged together to generate a length L resultant. For one embodiment, the merging yields a result comprising the desired data segments from both the first and second operands.

One increasingly popular use for computers involves manipulation of extremely large video and audio files. Even though these video and audio are typically transferred via very high bandwidth networks or high capacity storage media, data compression is still necessary in order to handle the traffic. As a result, different compression algorithms are becoming important parts of the representation or coding scheme for many popular audio, image, and video formats. Video in accordance with one of the Motion Picture Expert Group (MPEG) standards is one application that uses compression. MPEG video is broken up into a hierarchy of layers to help with error handling, random searching and editing, and synchronization.

For illustration purposes, these layers that constitute one MPEG video are briefly described. At the top level is a video sequence layer including a self-contained bit stream. The second layer down is a group of pictures composed of one or more groups of intra and/or non-intra frames. The third layer down is the picture layer itself and the next layer underneath that is a slice layer. Each slice is a contiguous sequence of raster ordered macroblocks, most often on a row basis in typical video applications, but not limited as such. Each slice consists of macroblocks, which are 16×16 arrays of luminance pixels, or picture data elements, with two 8×8 arrays of associated chrominance pixels. The macroblocks can be further divided into distinct 8×8 blocks for further processing, such as transform coding. The macroblock is a fundamental unit for motion compensation and motion estimation, and can have motion vectors associated with it. Depending on the embodiment, macroblocks can be 16 rows by 16 columns or a variety of dimensions.

One temporal prediction technique used in MPEG video is based on motion estimation. Motion estimation is based on the premise that consecutive video frames will generally be similar except for changes induced by objects moving within the frames. If there is zero motion between frames, an encoder can easily and efficiently predict the current frame as a duplicate of the previous or prediction frame. The previous frame may also be called the reference frame. In another embodiment, the reference frame can be the next frame or even some other frame in the sequence. Embodiments of the motion estimation are not required to compare a current frame against a previous frame. Thus any other frame used in the comparison. Then the information necessary to transmit to the encoder becomes the syntactic overhead needed to reconstruct the picture from the original reference frame. But when there is motion between the images, the situation is more complex. The differences between a best matching macroblock and the current macroblock would ideally be a lot of 0 values. When encoding a macroblock, the differences between the best match and the current macroblock are transformed and quantized. For one embodiment, the quantized values are communicated to a variable length coding for compression. As 0's can compress very well, a best match having many 0 differences values is desirable. Motion vectors can also be derived from the differences values.

Figure 19A:
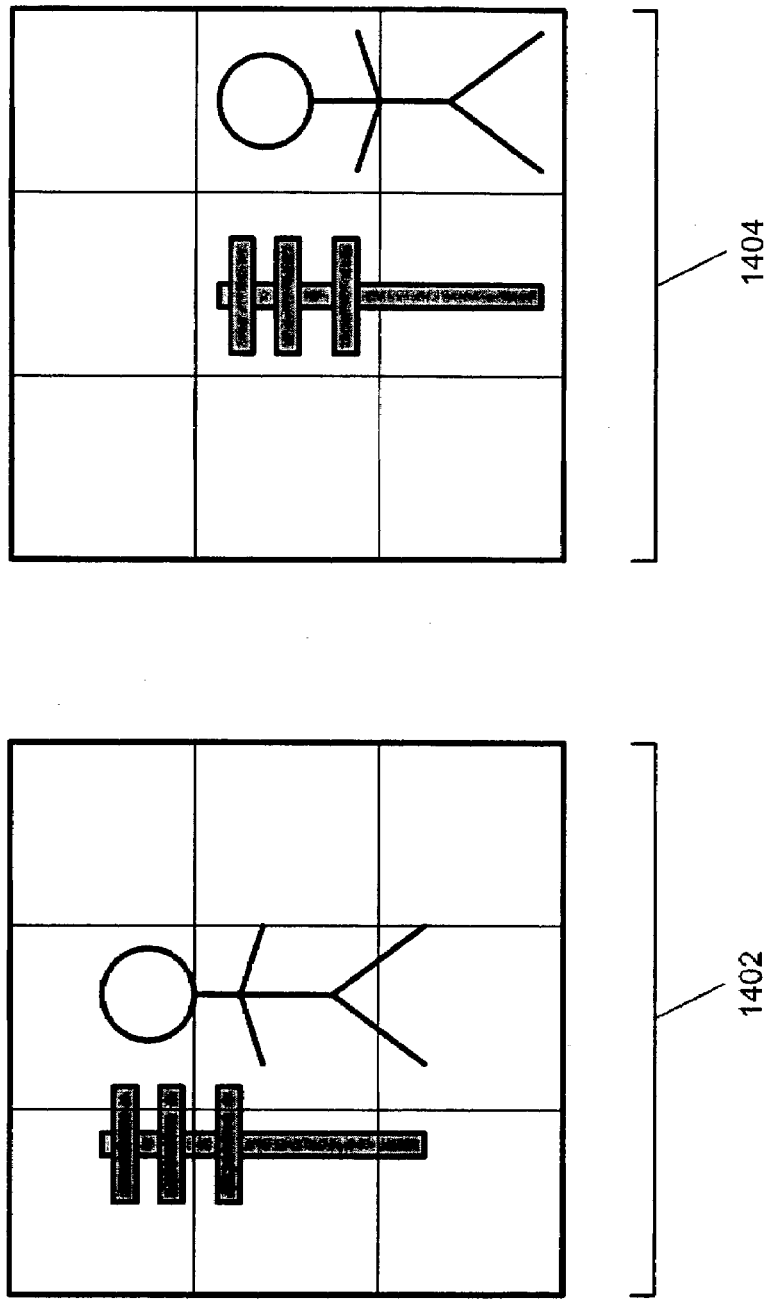
FIGS. 19A-B illustrate an examples of motion estimation.

FIG. 19A illustrates an first example of motion estimation. The left frame 1402 is an sample of a previous video frame including a stick figure and a signpost. The right frame 1404 is an sample of a current video frame including a similar stick figure and signpost. In the current frame 1404, panning has resulted in the signpost moving towards the right and down from its original position in the previous frame 1402. The stick figure with the now raised arms in the current frame has also shifted downwards to the right side from the center of the previous frame 1402. Motion estimation algorithms can be used to adequately represent the changes between the two video frames 1402, 1404.

For one embodiment, the motion estimation algorithm performs a comprehensive two dimensional (2D) spatial search for each luminance macroblock. Depending on the implementation, motion estimation may not be directly applied to the chrominance in MPEG video as the color motion maybe adequately represented by the same motion information as the luminance. Many different ways are possible for implementing motion estimation and the particular scheme for conducting motion estimation is somewhat dependent upon complexity versus quality issues for that specific application. A full, exhaustive search over a wide 2D area can generally yield the best matching results. However, this performance comes at an extreme computational cost, as motion estimation is often the most computationally expensive portion of video encoding. Attempts to lower the cost by limiting the pixel search range or type of search can cost some video quality.

Figure 19B:
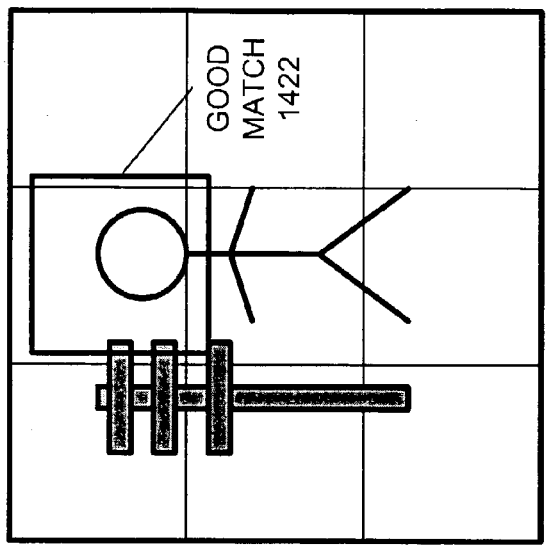
Figure 19B:
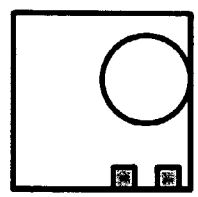
Figure 19B:
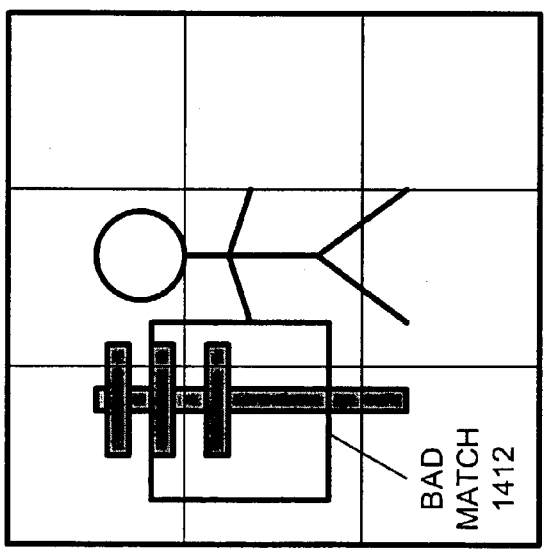

FIG. 19B illustrates an example of a macroblock search. Frames 1410, 1420, each include various macroblocks. The target macroblock 1430 of a current frame is the current macroblock to be matched with previous macroblocks from the previous frames 1410, 1420. In the first frame 1410, a bad match macroblock 1412 contains a portion of a signpost and is a bad match with the current macroblock. In the second frame 1420, a good match macroblock 1420 contains bits of a signpost and a head from the stick figure, like in the current macroblock 1430 to be coded. The two macroblocks 1422, 1430, have some commonality and only a slight error is visible. Because a relatively good match is found, the encoder assigns motion vectors to the macroblock. These vectors indication how far the macroblock has to be moved horizontally and vertically so that a match is made.

Figure 20:
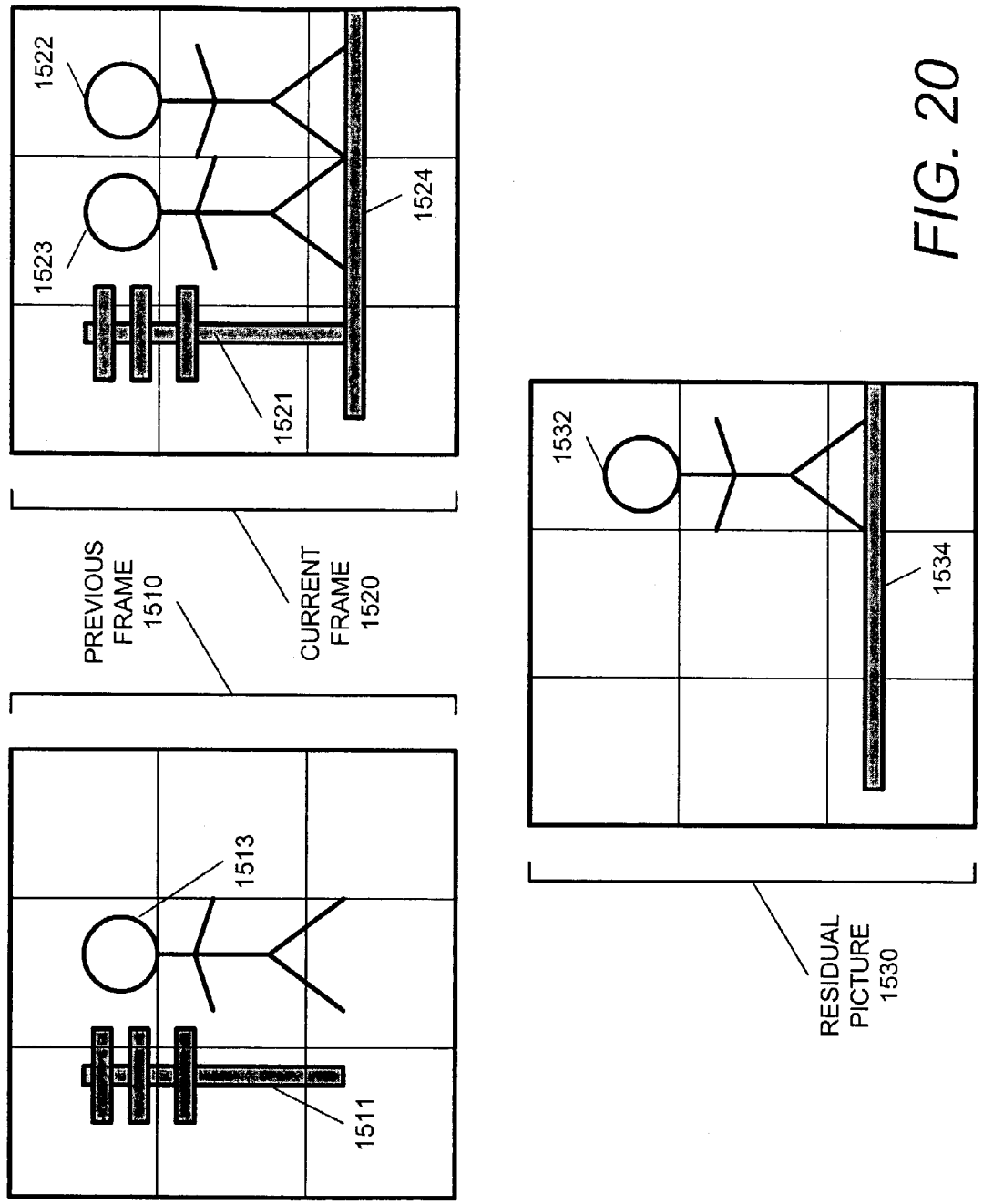
FIG. 20 illustrates an example application of motion estimation and a resulting prediction.

FIG. 20 illustrates an example application of motion estimation and a resulting prediction in generating a second frame. The previous frame 1510 comes before the current frame 1520 in time. For this example, the current frame 1520 is subtracted from the previous frame 1510 to obtain a less complicated residual error picture 1530 that can be encoded and transmitted. The previous frame of this example 1510 comprises of a signpost 1511 and a stick figure 1513. The current frame 1520 comprises of a signpost 1521 and two stick figures 1522, 1523, on a board 1524. The more accurate the motion is estimated and matched, the more likely that the residual error can approach zero and resulting in higher coding efficiency. Macroblock prediction can help to reduce the search window size.

Coding efficiency can be accomplished by taking advantage of the fact that motion vectors tend to be highly correlated between macroblocks. Thus, the horizontal component may be compared with the previously valid horizontal motion vector and the difference coded. Similarly, a difference for the vertical component can be calculated before coding. For this example, the subtraction of the current frame 1520 from the previous frame 1510 yields a residual picture 1530 including the second stick figure 1532 with upraised arms and the board 1534. This residual picture 1530 is compressed and transmitted. Ideally, this residual picture 1530 is less complex to code and takes less memory than compressing and transmitting the entire current frame 1520. However, not every macroblock search will result in an acceptable match. If the encoder determines that no acceptable match exists, the particular macroblock can encoded.

Figure 21A:
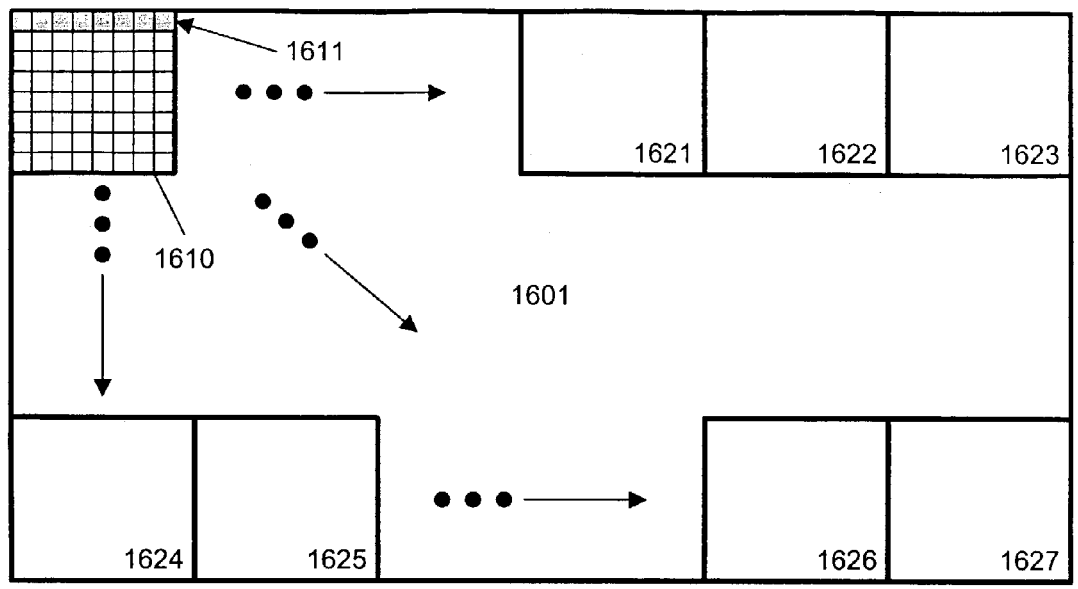
FIGS. 21A-B illustrate example current and previous frames that are processed during motion estimation.
Figure 21B:
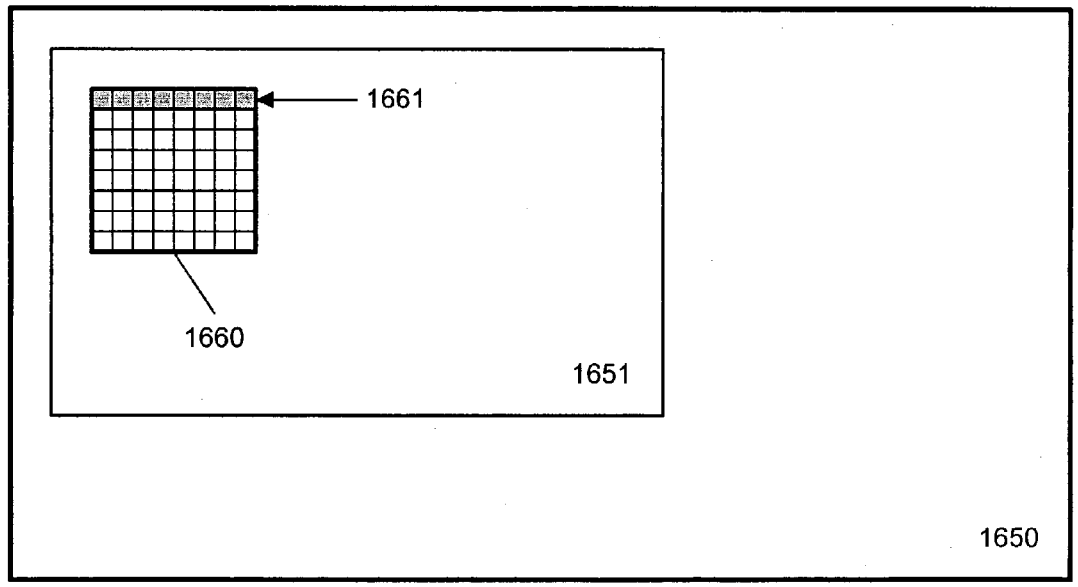

FIGS. 21A-B illustrate example current 1601 and previous 1650 frames that are processed during motion estimation. The previous frame 1650 precedes the current frame 1601 in chronological order for the video frame series. Each frame is comprised of a very large number of pixels that extend across the frame in horizontal and vertical directions. The current frame 1601 comprises of a number of macroblocks 1610, 1621-1627, that are arranged horizontally and vertically. For this embodiment, the current frame 1601 is divided into equally sized, non-overlapping macroblocks 1610, 1621-1627. Each of these square macroblocks are further subdivided into an equal number of rows and columns. For the same macroblock 1610, a matrix of eight rows and eight columns are visible. Each square of a macroblock 1610 corresponds to a single pixel. Thus this sample macroblock 1610 includes 64 pixels. In other embodiments, macroblocks have dimensions of sixteen rows by sixteen columns (16×16). For one embodiment, data for each pixel comprises of eight data bits or a single word. In alternative embodiments, data pixel can comprises of other sizes, including nibbles, words, double words, quad words, etc.

These current macroblocks of the current frame are attempted to be matched with macroblocks in the previous frame 1650 for motion estimation.

For this embodiment, the previous frame 1650 includes a search window 1651 in which a portion of the frame is enclosed by the search window 1651. The search window 1651 comprises the area in which a current macroblock from the current frame 1601 is attempted to be matched. Like the current frame, the search window is divided into a number of equally sized macroblocks. An example macroblock 1660 having eight rows and eight columns is illustrated here, but macroblocks can comprise of a various other dimensions including having sixteen rows and sixteen columns. During the motion estimation algorithm of one embodiment, each individual macroblocks from the search window 1651 are compared in sequence with a current macroblock from the current frame to find an acceptable match. For one embodiment, the upper left corner of the first previous macroblock in the search window 1651 is lined up with the upper left corner of the search window 1651. During one motion estimation algorithm, the direction of macroblock processing proceeds from the left side of the search window towards the right edge, pixel by pixel. Thus the leftmost edge of the second macroblock is one pixel over from left edge of the search window, and so on. At the end of the first pixel row, the algorithm returns to the left edge of the search window and proceeds from the first pixel of the next line. This process repeats until macroblocks for each of the pixels in the search window 1651 have been compared against the current macroblock.

FIGS. 22A-D illustrate the operations of motion estimation on frames in accordance with one embodiment of the present invention. Embodiments of the present invention as discussed herein involve full search motion estimation algorithms. With a full search, macroblocks for all pixel positions in a search window of a previous (reference frame) are attempted matches with a macroblock from the current frame. For one embodiment, the fast full search motion estimation algorithm employs SIMD shift right merge operations to quickly process packed data from frames. The SIMD shift right merge operations of one embodiment can also improves processor performance by reducing the number of data loads, especially unaligned memory loads, and other data manipulation instructions. The Generally, the motion estimation procedure of one embodiment can be described in pseudo code as:

```
for each current block in both x and y direction {
    for all mod 1 position in the y axis of the search window {
        for all mod 4 positions in the x axis of the search window {
            load pixel data from memory to registers;
            attempt block match for 4 adjacent previous macroblocks;
            keep track of minimum value and index location for
            that previous macroblock;
}}}
``` wherein a block match operation entails:

```
for each line of 1 to m {
    for each macroblock starting at column of 1 to 4 {
        generate correct data for this previous [line] from data held
        in registers; evaluate data[line] += sum of absolute
        differences (current [line], previous [line]);
}}.
```

Thus for this embodiment, previous macroblocks for each pixel location in the search window are evaluated against a current macroblock. As indicated above, this embodiment evaluates four adjacent previous macroblocks per loop. Pixel data is loaded from memory with memory aligned loads into registers. Through the use of shift right merge operations, this pixel data can be manipulated to form various combinations of shifted data segments appropriate to adjacent macroblocks. For example, the first, second, third, and fourth pixels on the first line of a first previous macroblock can start at memory addresses 0, 1, 2, and 3, respectively. For the first pixel of the first line of a second previous macroblock, that pixel begins at memory address 1. Thus a right shift merge operation on the register data can produce that necessary pixel line data for the second previous macroblock by reusing data already loaded from memory for the first previous macroblock, resulting in time and resource savings. Similar shift merge operations can generate the line data for other adjacent previous macroblocks like the third, fourth, and so on.

Thus the block matching procedure for the motion estimation algorithm of one embodiment can be described in pseudo code as:

```
block match for four adjacent previous macroblocks {
    for each line of 1 to m {
        load pixel data for one line of current macroblock;
        aligned memory loads of two consecutive chunks of pixel
        data for one line of search window from memory to registers;
        generate proper pixel data lines for each of the four adjacent
        previous macroblocks from loaded data through shift right merge
        operations;
        calculate sum of absolute differences between a line from a pre-
        vious macroblock and corresponding line from current macro-
        block for each of four adjacent previous macroblocks;
        accumulate four individual sum of absolute differences values for
        each of four adjacent previous macroblocks;
    }}.
```

This procedure is further described below. Although these examples are described in terms of operating on four adjacent macroblocks of a search window, alternative embodiments of the present invention are not limited as such. However, embodiments of the present invention are not restricted to or limited to operating on adjacent macroblocks. Nor does the multiple reference macroblocks being processed together necessary have to vary by a single pixel distance. For one embodiment, any reference macroblocks having a pixel located within a 16 by 16 window around a specific pixel location can be processed together. Depending on the amount of hardware resources, such as available data registers and execution units, other embodiments can perform block matching and sum of absolute differences calculations on more or less number of macroblocks. For example, another embodiment having at least 8 packed data registers to hold 4 different combinations of pixel data generated from shift right merge operations on two 8 data segment wide data chunks, could be able to operate on 4 adjacent previous macroblocks with simply two aligned 8 data segment wide memory loads. Four of the 8 packed data registers are used for computation overhead: holding the first 8 data segments from the previous frame, the next 8 data segments of the previous frame, 8 data segments for the current frame, and 8 data segments from shift right merge operations. The other four packed data registers are used for accumulating totals for the sum of absolute differences (SAD) values for each of the four macroblocks. More packed data registers may be added for the SAD calculations and accumulations though to increase the number of reference macroblocks that are processed together. Thus if four additional packed data registers are available, four additional previous macroblocks can be processed also. The number of packed data registers available to hold accumulated sum of absolute differences in one embodiment can limit how many macroblocks can be processed at a time.

Furthermore, in some processor architectures, memory accesses have specific granularities and are aligned with certain boundaries. For instance, one processor can make memory accesses based on 16 or 32 byte blocks. In that case, accessing data not aligned at a 16 or 32 byte boundary could require an unaligned memory access, which is costly in execution time and resources. Even worse, a desired piece of data may cross a boundary and overlap multiple memory blocks. Cache line splits that would require unaligned loads in order to access data located on two separate cache lines, can be costly. Data lines that cross a memory page boundary are even worse. For example, with a process that operates with 8 byte memory blocks and a macroblock spanning 8 pixels having a byte of data per pixel, one aligned memory load would suffice for that macroblock line. But for the next adjacent macroblock, one pixel column over, the data needed for that pixel line would span 7 data bytes of the memory block from the first macroblock, but also across a memory boundary for 1 data byte of the next memory block. Embodiments of the present invention employ shift right merge operations to efficiently process the data. In one embodiment, two consecutive memory blocks are loaded at aligned memory boundaries and held in registers for multiple uses. Shift right merge operations can take these memory blocks and shift the data segments in them by the necessary distances to obtain the correct data line. So with this example, a shift right merge instruction can take the two already loaded memory blocks and shift one data byte out of the second block and shift one data byte into the second block from the first to generate the data for the first line of the second macroblock, without having to perform an unaligned load. Embodiments of the motion estimation can also break dependency chains based on how the algorithm is implemented. For instance, by modifying the order of the computations, data/instruction dependencies can be removed or shifted such that certain computations and instructions can be executed out of order as in the processor 1000 of FIG. 15. Performance improvements can become even greater with newer generations of processor architectures because of increased execution latencies and available computation resources. By using an embodiment of the shift right merge instruction, certain dependencies in the block matching sequence can be avoided. For instance, multiple sum of absolute differences operations and/or accumulation operations can execute in parallel.

Figure 22A:
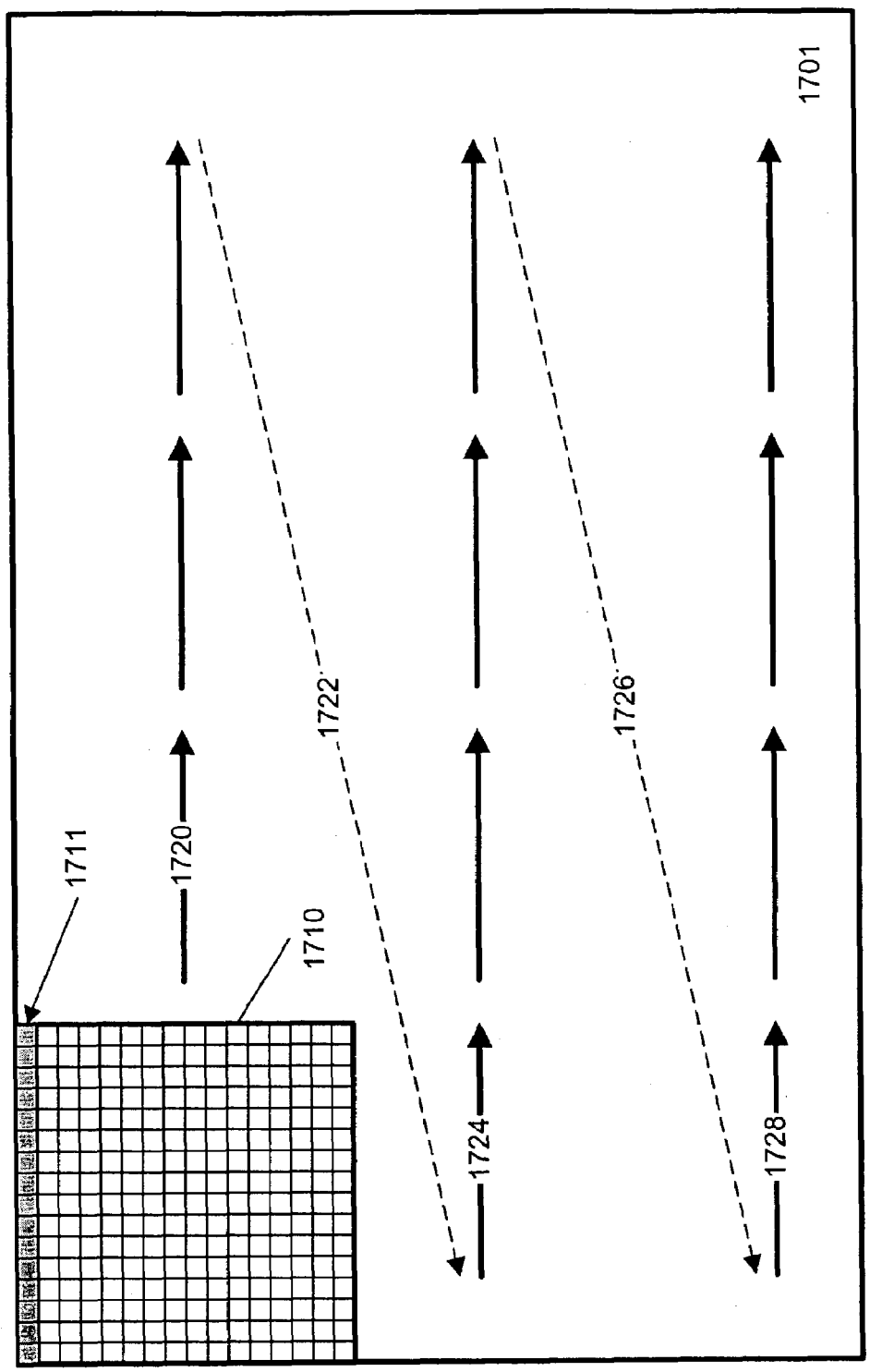
FIGS. 22A-D illustrate the operations of motion estimation on frames in accordance with one embodiment of the present invention.

FIG. 22A illustrates the progression of the current macroblocks across the current frame 1701. For this embodiment, each current macroblock 1710 is divided into 16 rows and 16 columns, and thus comprising 256 individual pixels. For this embodiment, the pixels in each macroblock 1710 are processed an individual row 1711 at a time. When all sixteen rows of the current block have been processed against the desired macroblocks in a search window, the next current macroblock is processed. The macroblocks of this embodiment are processed in a horizontal direction 1720 from the left side to the right side of the current frame 1701 at macroblock sized steps. In other words, the current macroblocks do not overlap in this embodiment and the current macroblocks are arranged such that each macroblock sits adjacent to the next. For example, the first macroblock can extend from pixel column 1 to pixel column 16. The second macroblock would extend from column 17 to column 32, and so on. At the end of the macroblock row, the process returns 1722 to the left edge and drops down by one macroblock height, sixteen rows in this example. The macroblocks one macroblock sized step down are then processed horizontally 1724 from left to right until attempted matches for the entire frame 1701 are completed.

Figure 22B:
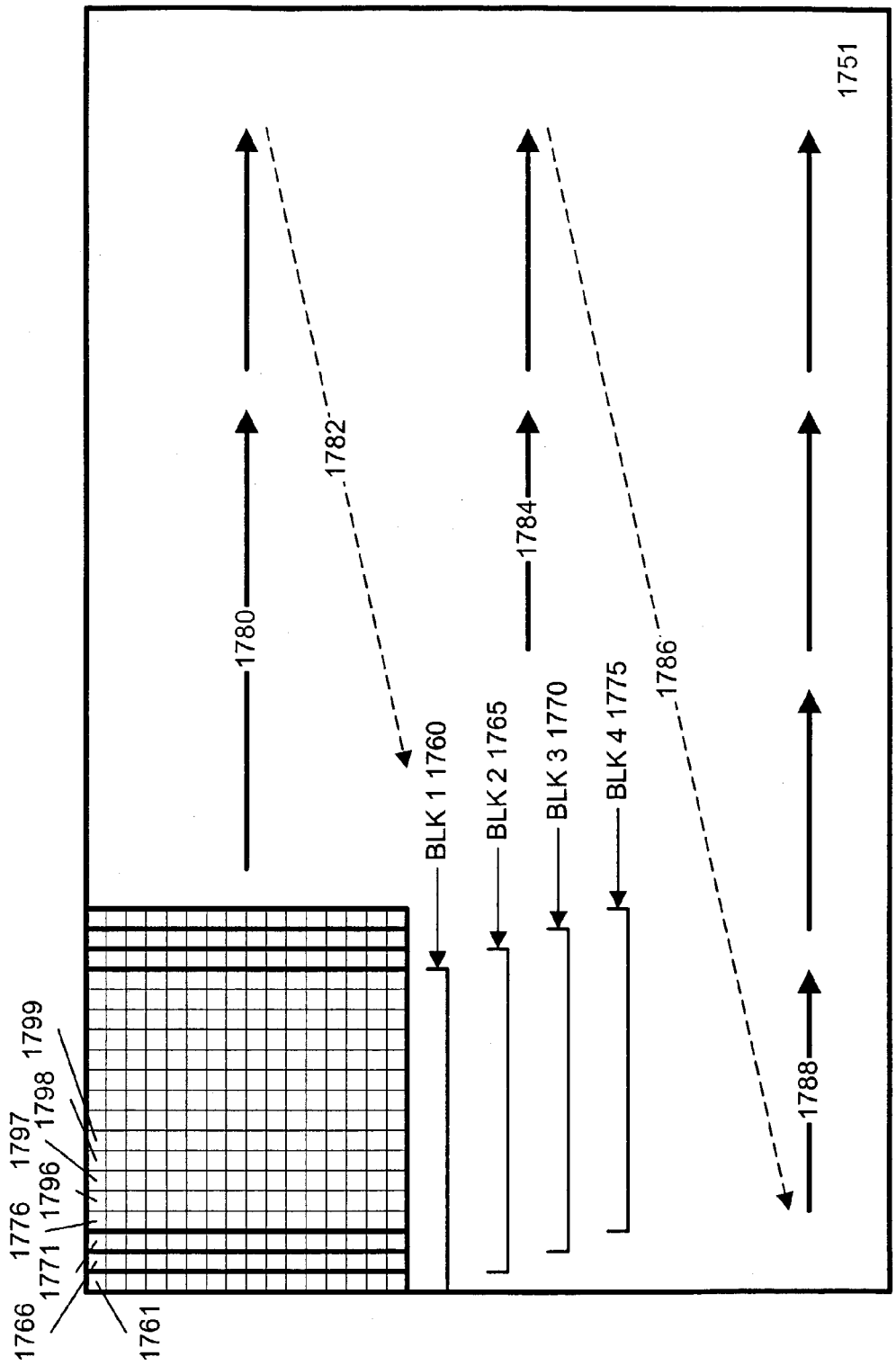

FIG. 22B illustrates the progression of the macroblocks across the search window 1751 of a previous (reference) frame. Depending on the particular implementation, the search window 1751 can be focused on a certain area and thus be smaller than the entire previous frame. In another embodiment, the search window can overlap the previous frame completely. Like the current block, each previous macroblock 1760, 1765, 1770, 1775, is divided into 16 rows and 16 columns, for a total of 256 pixels in each macroblock. For this embodiment of the present invention, four previous macroblocks 1760, 1765, 1770, 1775, of the search window 1751 are processed in parallel against a single current block in search of a match. Unlike the current macroblocks of a current frame, the previous macroblocks 1760, 1765, 1770, 1775, in a search window 1751 can and do overlap as in this example. Here, each previous macroblock is shifted by one pixel column. Thus leftmost pixel on the first row of BLK 1 is pixel 1761, for BLK 2 it is pixel 1766, for BLK 3 it is pixel 1771, and pixel 1776 for BLK 4. During a motion estimation algorithm, each row of a previous macroblock 1760, 1765, 1770, 1775, is compared against a corresponding row of a current block. For example, row 1 of BLK 1 1760, BLK 2 1765, BLK 3 1770, and BLK 4 1775, is each processed with a current block row 1.

The row by row comparison for the four overlapping, adjacent macroblocks continues until all 16 rows of the macroblocks are done. The algorithm of this embodiment shifts over by four pixel columns to operate on the next four macroblocks. Thus for this example, the leftmost first pixel column for the next four macroblocks would be pixel 1796, pixel 1797, pixel 1798, and pixel 1799, respectively. For this embodiment, the previous macroblock processing continues rightward 1780 across the search window 1751, wrapping around 1782 to restart down one pixel row at the leftmost pixel of the search window 1751, until the search window is completed. Whereas the current macroblocks of a current frame of this embodiment do not overlap and next individual macroblocks are a macroblock height or width, the previous macroblocks of a previous or reference frame do overlap and next macroblocks are incremented by a single pixel row or column. Although the four reference macroblock 1760, 1765, 1770, 1775, of this example are adjacent and differ by a single pixel column over, any macroblock in the search window 1751 that overlaps a specified region around a chosen pixel location can be processed together with the macroblock at that pixel location. For instance, the macroblock 1760 at pixel 1796 is being processed. Any macroblock within a 16×16 window around pixel 1796 can be handled together with macroblock 1760. The 16×16 window of this example is due to the dimensions of a macroblock and the line width of a row. In this case, one row or data line has 16 data elements. Because this block matching function for this embodiment of a motion estimation algorithm can load two data lines of 16 data elements and perform shift right merges to generate various data lines having shifted/merged versions of the two data lines, other macroblocks that overlap the 16×16 window for which data will be loaded for this macroblock will be able to at least partially reuse that loaded data. Thus any macroblock overlapping the macroblock 1760, such as macroblocks 1765, 1765, 1770, 1775, or a macroblock starting at the bottom right pixel position of macroblock 1760, can be processed together with macroblock 1760. The difference in the amount of overlap influences the amount of data that can be reused from previous data loads.

With embodiments of motion estimation in accordance to the present invention, the macroblock analysis comprises a comparison between a previous (reference) macroblock and a current macroblock on a row by row basis to obtain a sum of absolute differences value between two macroblocks. The sum of absolute differences value can indicate how different the macroblocks are and how close of a match exists. Each previous macroblock for one embodiment can be represented by a value obtained by accumulating the sum of absolute differences for all sixteen rows in the macroblock. For the current macroblock that is being analyzed, a notation of the closest matching macroblock is maintained. For instance, the minimum accumulated sum of absolute differences value and the location index for that corresponding previous macroblock is tracked. As the motion estimation progresses across the search window, the accumulated sum of each previous macroblock is compared against the minimum value. If the more recent previous macroblock has a smaller accumulated differences value than that of the tracked minimum value, thus indicating a closer match than the existing closest match, then the accumulated differences value and the index information for that recent previous macroblock becomes the new minimum differences value and index. When available macroblocks for all the pixels in a search window have been processed in one embodiment, the indexed macroblock with the minimum differences value can be used in helping to obtaining a residual picture for compression of that current frame.

Figure 22C:
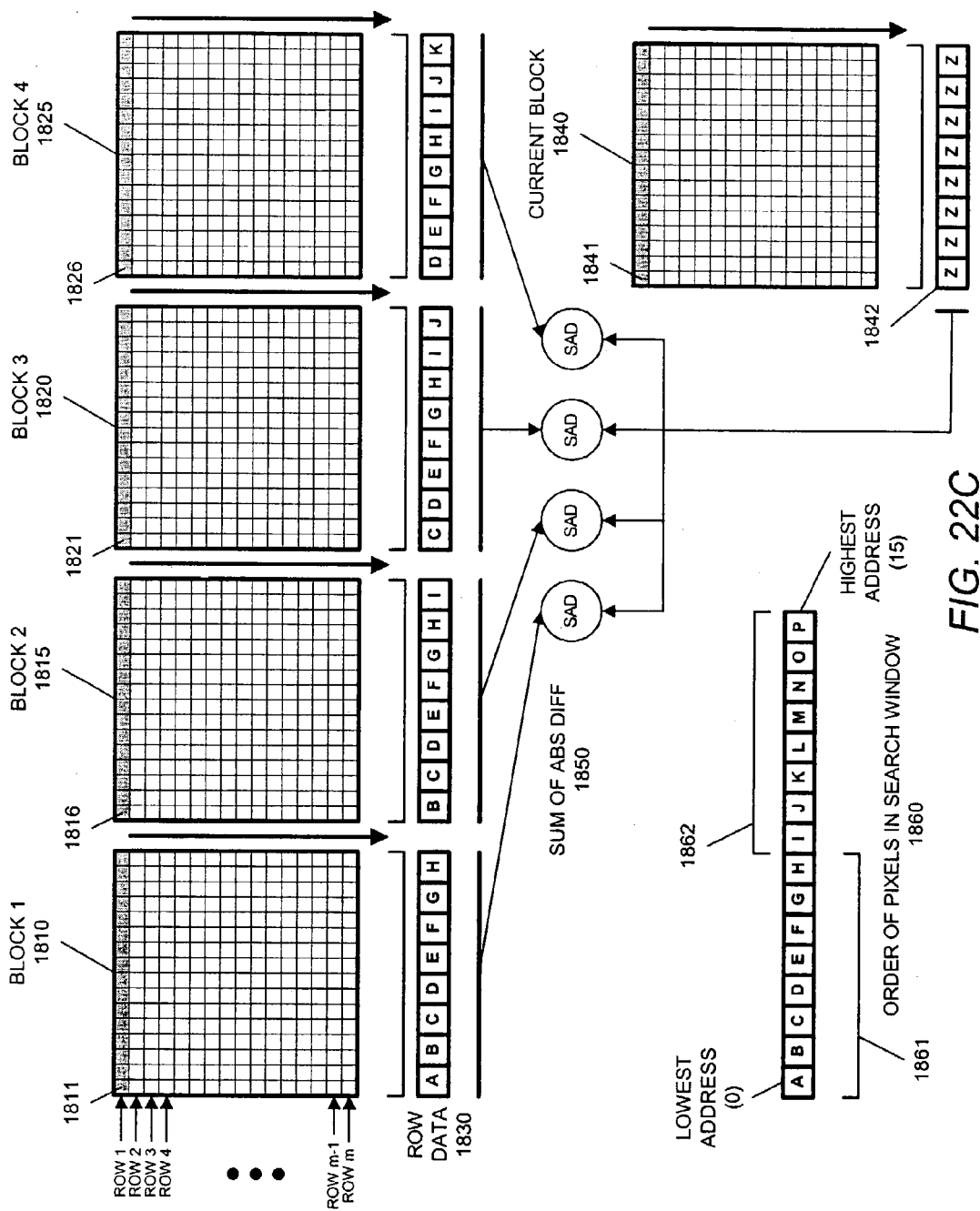

FIG. 22C illustrates the parallel processing of four reference macroblocks 1810, 1815, 1820, 1825 for a given search window with a current block 1840 for one embodiment of the present invention. For this example, the data for the pixels in the search window are ordered as "A, B, C, D, E, F, G, H, I, J, K, L, M, N, O, P" 1860, wherein "A" is at the lowest address position (0) in the data set and "P" is at the highest address position (15). This set of pixels 1860 comprises of two sections 1681, 1682, having eight (m) data segments each. The use of a right shift merge operations, as described up above, allows embodiments of the present invention to manipulate operands with the two data sections 1618, 1682, and to generate properly aligned row data 1830 for the different previous macroblocks 1810, 1815, 1820, 1825. Each macroblock, previous 1810, 1815, 1820, 1825, and current 1840, has a size of m rows by m columns. For discussion purposes and to keep things simple, m is equal to eight in this example. Alternative embodiments can have different sized macroblocks wherein m is equal to 4, 16, 32, 64, 128, 256, etc., for example.

In this example, the motion estimation algorithm is applied to the first row of these four previous blocks 1810, 1815, 1820, 1825, with that of the current block 1840. For one embodiment, the pixel data including the two data sections 1861, 1862, for two macroblocks width (2m) is loaded from memory with two aligned memory load operations and held in temporary registers. Shift right merge operations on these two data sections 1861, 1862, allows for the generation of nine possible combinations of row data 1830 without numerous memory accesses. Furthermore, unaligned memory loads, which are costly in execution time and resources, can be avoided. In this example, the two data sections 1861, 1862, are aligned with byte boundaries. Memory loads that do not start with an address on a byte boundary such as from data segment B, D, or D, would typically require an unaligned memory load operation. The row data 1830 for each of the blocks is as follows, wherein the leftmost data segment is the lowest address. In BLOCK 1 1810, ROW 1 1811 comprises of "A, B, C, D, E, F, G, H". As the data in ROW 1 1811 is the same as the first data section 1861, shifting is not needed. But ROW 1 1816 of BLOCK 2 1815 comprises of "B, C, D, E, F, G, H, I". Because previous BLOCK 1 1810 and BLOCK 2 1815 are separated by one pixel horizontally, BLOCK 2 1815 begins with pixel data B whereas BLOCK 1 1810 begins with pixel data A and the second pixel data is B. Thus a shift right merge of the two data sections 1861, 1862, with a shift count of one would yield the BLOCK 2 ROW 1 data.

Similarly, BLOCK 3 1820 is one more pixel over to the right and ROW 1 1821 of BLOCK 3 1820 begins with pixel data C and comprises of "C, D, E, F, G, H, I, J". A shift right merge operation on operands of the two data sections 1861, 1862, with a shift count of two produces the BLOCK 3 ROW 1 data. ROW 1 1826 of BLOCK 4 1825 is comprised of "D, E, F, G, H, I, J, K". This data can be produced with a shift right merge operation of four count on the same data operands. Thus the use of shift right merge operations on temporarily saved, previously loaded data sections 1861, 1862, allows for the reuse of the data in generating row data for other adjacent macroblocks and the saving of time/resources by reducing the number of memory loads, especially unaligned memory loads. Note that the pixel data for the current block is the same for all the sum of absolute differences comparisons against the reference macroblocks of the previous frame. A single aligned memory load may be possible for the row data 1842 of the current block 1840, as the current block 1840 may be aligned with memory boundaries.

Proceeding with this example of one embodiment of motion estimation, each row of a previous macroblock 1810, 1815, 1820, 1825, is compared with the corresponding row of the current block 1840 to obtain a sum of absolute differences value. Thus ROW 1 1811 of BLOCK 1 1810 is compared with ROW 1 1841 of the current block 1840 in a sum of absolute differences (SAD) operation 1850. The same occurs with the other three blocks that are being operated on here. Although it appears that the four macroblocks 1810, 1815, 1820, 1825, are being operated on concurrently or in parallel, other embodiments of the present invention are not limited as such. Thus operations on these four macroblocks can occur in series in time, but as a sequence of four. For example, row 1 of each reference block undergoes a SAD operation 1850 with that of the current block 1840 in the order of BLOCK 1 1810, BLOCK 2 1815, BLOCK 3 1820, and BLOCK 4 1825. Then row 2 of each reference block undergoes a SAD operation 1850, and so on. After each SAD operation 1850, a running total for the sum of absolute differences is accumulated in a temporary register. Thus, in this example embodiment, four registers accumulates the sum of absolute differences until all m rows of that macroblock are done. The accumulated value for each block is compared with the existing minimum differences value as part of a best macroblock match search. Although this example describes the processing of four adjacent, overlapping previous macroblocks, other macroblocks that overlap the first block BLK 1810 in the search window can also be processed together with the data loads for BLK 1810 if the data lines are relevant. Thus a macroblock within a 16×16 window around the present macroblock being processed can be processed too.

Figure 22D:
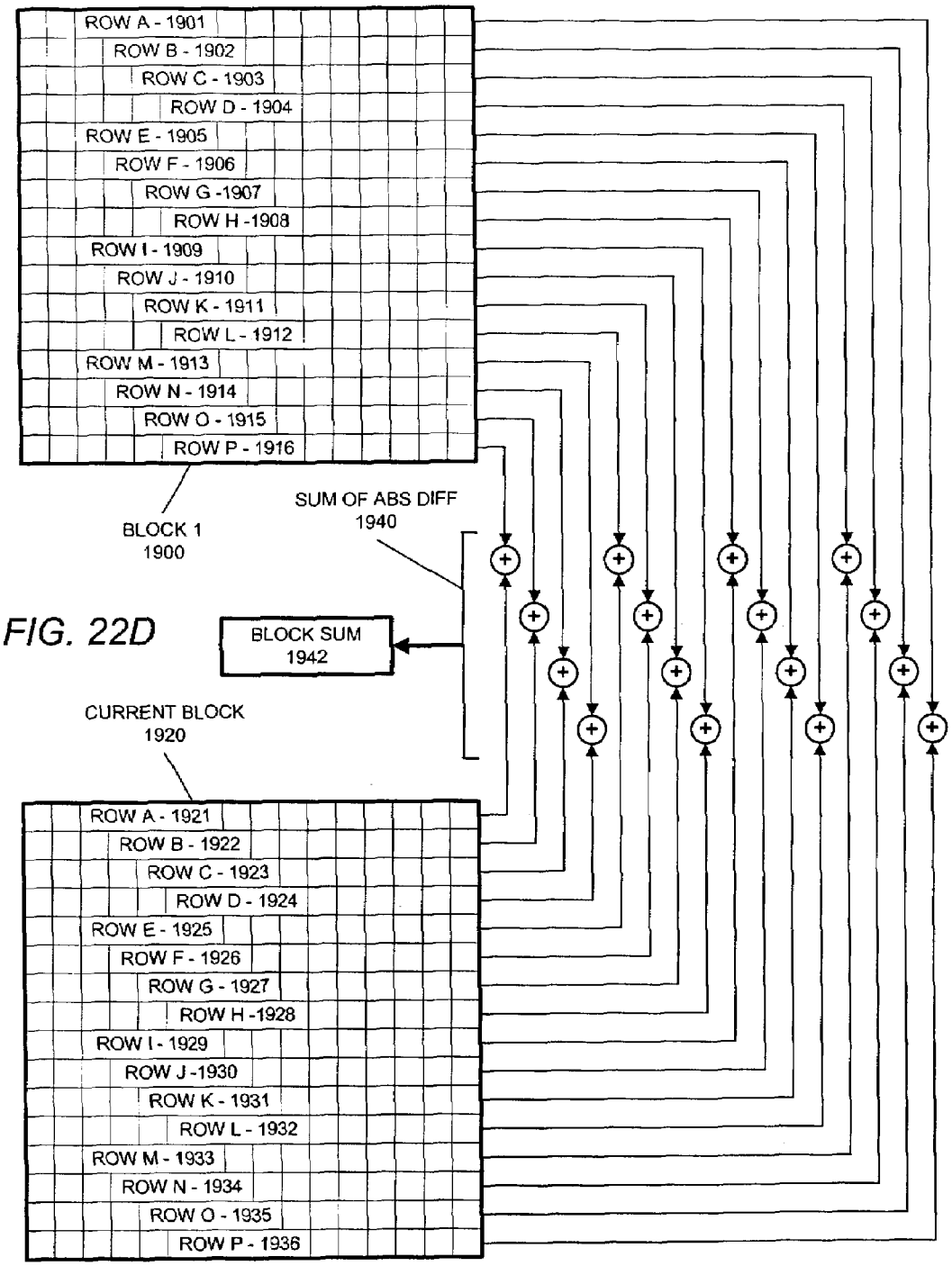

FIG. 22D illustrates the sum of absolute differences (SAD) operations 1940 and summation of those SAD values. Here, each of the rows from ROW A to ROW P for the reference macroblock BLOCK 1 1900 and its counterpart for the current macroblock 1920 undergo a SAD operation 1940. The SAD operation 1940 compares the data representing the pixels in each row and calculates a value representing the absolute differences between the two rows, one from the previous macroblock 1900 and one from the current macroblock 1920. The values from these SAD operations 1940 for all the rows, A through P, are summed together as a block sum 1942. This block sum 1942 provides an accumulated value of the sum of absolute differences for the entire previous macroblock 1900 and the current macroblock 1920. Based on this block sum 1942, the motion estimation algorithm can determine how similar or close of a match the previous macroblock 1900 is with respect to this current macroblock 1920.

Although this embodiment operates on four reference macroblocks at a time, alternative embodiments can work on a different number of macroblocks depending on the amount of pixel data loaded and the number of available registers. Furthermore, a variety of registers can be used during a motion estimation process. For example, extended registers, such as mm registers of MMX technology or XMM registers of SSE2 technology can be used to hold packed data like the pixel data. In one embodiment, a 64 bits wide MMX register can hold eight bytes, or eight individual pixels if each pixel has eight bits of data. In another embodiment, a 128 bits wide XMM register can hold sixteen bytes, or sixteen individual pixels if each pixel has eight bits of data. Similarly, registers of other sizes, such as 32/128/256/512 bits wide, that can hold packed data can also be used with embodiments of the present invention. On the other hand, calculations that do not require a packed data register, such as regular integer operations, can use integer registers and integer hardware.

Figure 23A:
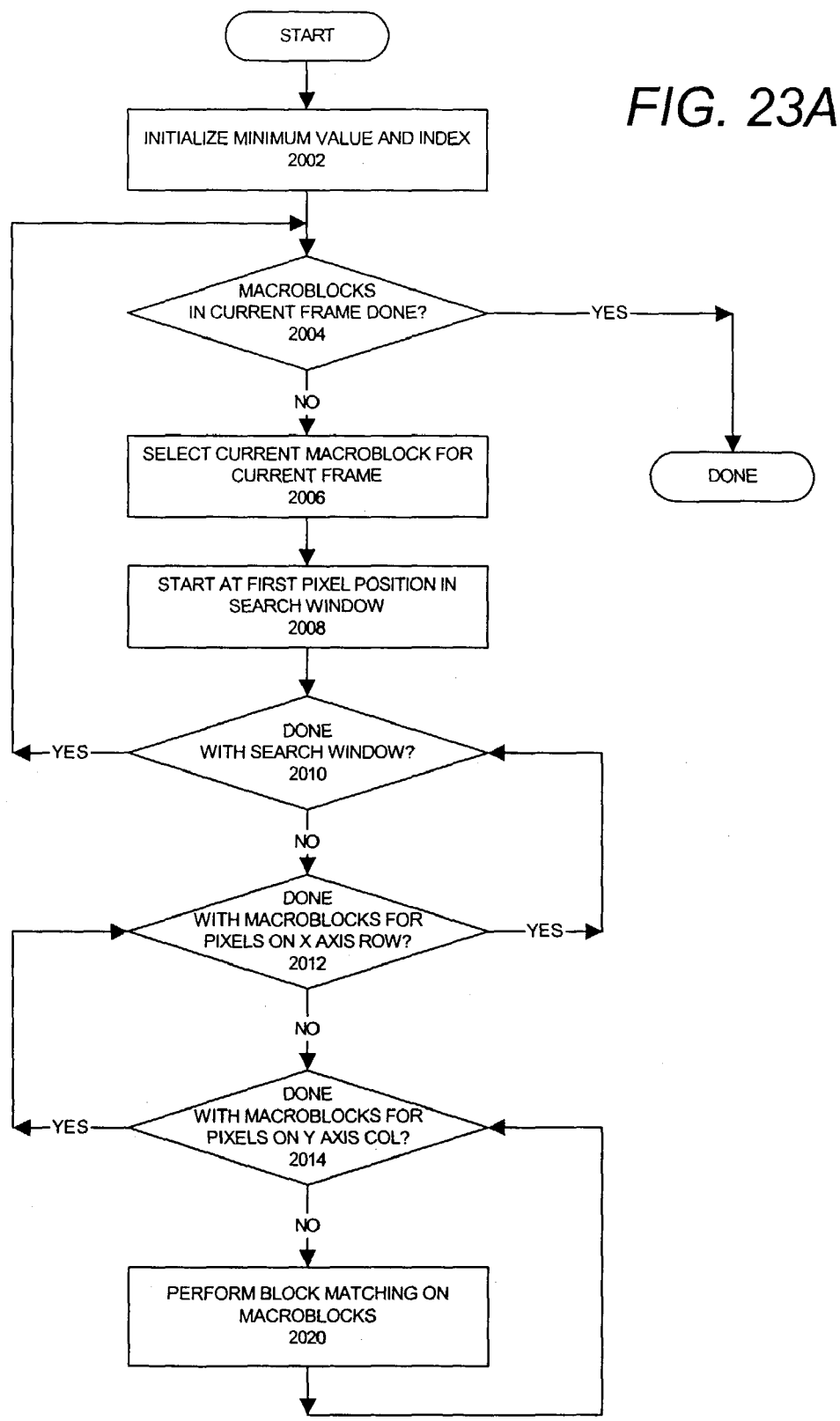
FIGS. 23A-B is a flow chart illustrating one embodiment of a method to predict and estimation motion.

FIG. 23A is a flow chart illustrating one embodiment of a method to predict and estimation motion. At block 2002, the tracked minimum (min) value and index location for that minimum value is initialized. For this embodiment, the tracked min value and index indicate which of the processed previous (reference) macroblocks from the search window is the closest match to current macroblock. A check is made at block 2004 as to whether all the desired macroblocks in the current frame have been completed. If so, this portion of the motion estimation algorithm is done. If not all the desired current macroblocks have been processed, an unprocessed current macroblock is selected for the current frame at block 2006. The block matching proceeds from the first pixel position in the search window of the previous (reference) frame at block 2008. At block 2010, a check of whether the search window has been completed is made. With the first pass, none of the search window has been processed. But with a subsequent pass, if the entire search window has been processed, the flow returns to block 2004 to determine if other current macroblocks are available.

If the entire search window has not been analyzed, a check at block 2012 is made to determine if all the pixels along this X axis row has been processed. If this row has been done, the row count increments to the next row and the flow returns to block 2010 to see if more macroblocks on this new row are available in the search window. But if not all available macroblocks for pixels on the row have been processed, a check is made at block 2014 as to whether the macroblock at this pixel column and row has been processed. If the macroblock has been processed, the column count is incremented and the flow returns to block 2012 to see if the macroblock for the pixel at this new column has been processed. But if the macroblock for the pixel at this column and row has not been processed, block matching is performed between this reference macroblock and the current macroblock.

The flow in this example is described with the incrementing of rows and column locations for pixels along the X and Y axis, one pixel at a time for simplicity. However, for one embodiment of the present invention, four previous macroblocks are processed per pass. Thus the column count along the Y axis would be incremented by four columns per pass. Other embodiments can also process 8, 16, 32, etc. macroblocks at a time, and thus the column count is correspondingly incremented by 8, 16, 32, etc. columns to point at the correct pixel position for the subsequent pass of the algorithm. Although the block matching process of this embodiment employs a search along the X and Y axes in a ordered fashion, the block matching of another embodiment can use another algorithm like a diamond search, which uses a different pattern, or a log search.

Figure 23B:
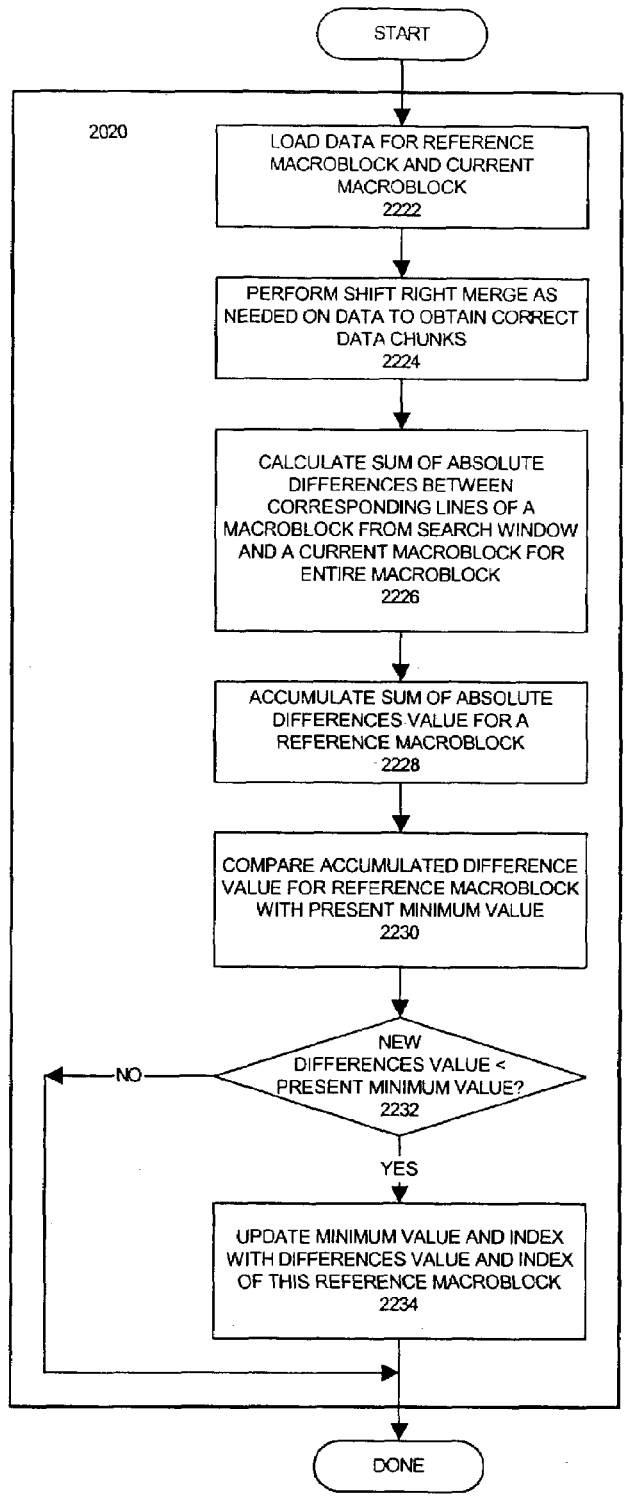

FIG. 23B is a flow chart further describing the block matching of FIG. 23A. At block 2222, the data for the reference macroblock and the current macroblock are loaded. For one embodiment, the reference macroblock data is loaded as two packed data chunks includes data for a number of consecutive pixels. In one embodiment, each packed data chunk comprises of eight data elements. At block 2224, shift right merge operations are performed as needed on the data chunks to obtain correct data chunk. For the above embodiment where four previous macroblocks are processed together, shift right merge operations can generate for data chunks corresponding to the lines located in each macroblock. The data chunk for each adjacent macroblock one pixel position over is also shifted one over, wherein the macroblocks appear to slide across a search window one pixel at a time for each pixel row in the search window. The operations at blocks 2226, 2228, 2230, and 2232, are applied to each of the four previous macroblocks being processed together. For one embodiment, all four macroblocks undergo the same operation before the next operation occurs. For anther embodiment, a single previous macroblock may complete all the operations before the next previous macroblock with a data chunk including the appropriately shifted data segments is processed.

The sum of absolute differences between the corresponding lines of the previous macroblock and the current macroblock is calculated for each row of these macroblocks at block 2226. At block 2228, the sum of absolute differences for all the lines in the previous macroblock are accumulated together. At block 2230, the accumulated differences value for the previous macroblock is compared against the present minimum value. If the differences value for this previous macroblock is less than the present min value at block 2232, the min value is updated with this new differences value. The index is also updated to reflect the location of this previous macroblock to indicate that this previous macroblock is the closest match so far. But if the new differences value is greater than the present min value at block 2232, then this previous block is not a closer match than what has been matched so far.

Embodiments of motion estimation algorithms in accordance with the present invention can also improve processor and system performance with present hardware resources. But as technology continues to improve, embodiments of the present invention when combined with greater amounts of hardware resources and faster, more efficient logic circuits, can have an even more profound impact on improving performance. Thus, one efficient embodiment of the motion estimation can have different and greater impact across processor generations. Simply adding more resources in modem processor architectures alone does not guarantee better performance improvement. By also maintaining the efficiency of applications like one embodiment of the motion estimation and the shift right merge instruction (PSRMRG), larger performance improvements can be possible.

Although the examples above are generally described in the context of 64 bits wide hardware/registers/operands to simplify the discussion, other embodiments employ 128 bits wide hardware/registers/operands to perform register merge operations, shift right merge operations, and motion estimation calculations. Furthermore, embodiments of the present invention are not limited to specific hardware or technology types such as MMX/SSE/SSE2 technologies, and can be used with other SIMD implementations and other graphical data manipulating technologies. Although the motion estimation and block matching embodiments as described above for FIGS. 20-23B are described in the context of eight pixels wide or eight data elements wide lines/rows and eight rows by eight columns sized macroblocks, other embodiments include other dimensions. For instance, lines/rows can be sixteen pixels wide or sixteen data elements wide and macroblocks be sixteen rows by sixteen columns.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. An apparatus comprising:
a decoder to decode a shift right merge instruction;
a scheduler to dispatch said instruction for execution with a first operand comprised of a first set of L data elements, a second operand comprised of a second set of L data elements, and a shift count of M; and
an execution unit to execute said instruction, said instruction to cause said execution unit to:
shift said first operand left by 'L-M' data elements;
shift said second operand right by M data elements;
merge said shifted first operand with said shifted second operand to generate a resultant having L data elements.

2. The apparatus of claim 1 wherein said shift right merge instruction is comprised of one micro-instruction (uop).

3. The apparatus of claim 2 wherein said shift left of said first operand generates a shifted first set of data comprised of M data elements aligned with a leftmost edge of said first operand.

4. The apparatus of claim 3 wherein said shift left removes 'L-M' data elements from said first operand and wherein zeroes are inserted at a right edge of said first operand to replace space vacated by said shifted out 'L-M' data elements.

5. The apparatus of claim 4 wherein said shift right of said second operand generates said shifted second set comprising of 'L-M' data elements aligned with a right edge of said second operand.

6. The apparatus of claim 5 wherein said shift right removes said M data elements from said second operand and wherein zeroes are inserted at a left edge of said second operand to replace space vacated by said shifted out M data elements.

7. The apparatus of claim 6 wherein said first operand, said second operand, and said resultant are packed data registers.

8. The apparatus of claim 7 wherein each data element is a byte of data.

9. The apparatus of claim 8 wherein L is equal to 8.

10. The apparatus of claim 9 wherein M is a value ranging from 0 to 15.

11. The apparatus of claim 10 wherein said apparatus comprises a 64 bit architecture.

12. The apparatus of claim 8 wherein L is equal to 16, M is a value ranging from 0 to 31, and said apparatus comprises a 128 bit architecture.

13. A system comprising:
a memory to store data and instructions;
a processor coupled to said memory on a bus, said processor operable to perform a shift right merge operation, said processor comprising:
a bus unit to receive an instruction from said memory;
a decoder to decode an instruction to perform a shift right merge of shift count M on a first operand having a first set of K data elements and a second operand having a second set of L data elements;
a scheduler to dispatch said decoded instruction for execution; and
an execution unit to execute said decoded instruction, said decoded instruction to cause said execution unit to:
shift said first operand left by 'K–M' data elements;
shift said second operand right by M data elements;
merge said shifted first operand with said shifted second operand to generate a resultant having K data elements.

14. The system of claim 13 wherein K is equal to L, and K and L are both 8.

15. The system of claim 13 wherein:
said shift left removes 'K–M' data elements from said first operand and wherein zeroes are inserted at a right edge of said first operand to replace space vacated by said shifted out 'K–M' data elements; and
said shift right removes said M data elements from said second operand and wherein zeroes are inserted at a left edge of said second operand to replace space vacated by said shifted out M data elements.

16. The system of claim 13 wherein each data element comprises a byte of data, and said first operand and said second operands are packed data operands.

17. An apparatus comprising:
an execution unit to execute a shift merge instruction including a first operand comprised of a first set of L data elements, a second operand comprised of a second set of L data elements, and a shift count of M, said instruction to cause said execution unit to: shift said first operand by 'L–M' data elements;
shift said second operand by M data elements;
merge said shifted first operand with said shifted second operand to generate a resultant having L data elements.

18. The apparatus of claim 17 wherein said shift right merge instruction is comprised of a single micro-instruction (uop).

19. The apparatus of claim 17 wherein said first operand is shifted left by 'L–M' data elements and said second operand is shifted right by M data elements.

20. The apparatus of claim 19 wherein:
said shift left of said first operand generates a shifted first set of data comprising M data elements aligned with a left edge of said first operand, and wherein said shift left removes 'L–M' data elements from said first operand and inserts zeroes at a right edge of said first operand; and
said shift right of said second operand generates said shifted second set of data comprising 'L–M' data elements aligned with a right edge of said second operand, and wherein said shift right removes M data elements from said second operand and inserts zeroes at a left edge of said second operand.

21. The apparatus of claim 17 wherein said first operand is shifted right by 'L–M' data elements and said second operand is shifted left by M data elements.

22. The apparatus of claim 21 wherein:
said shift right of said first operand generates a shifted first set of data comprising M data elements aligned with a right edge of said first operand, and wherein said shift right removes 'L–M' data elements from said first operand and inserts zeroes at a left edge of said first operand; and
said shift left of said second operand generates said shifted second set of data comprising 'L–M' data elements aligned with a left edge of said second operand, and wherein said shift left removes M data elements from said second operand and inserts zeroes at a right edge of said second operand.

* * * * *

UNITED STATES PATENT AND TRADEMARK OFFICE
CERTIFICATE OF CORRECTION

PATENT NO. : 7,272,622 B2
APPLICATION NO. : 10/280511
DATED : September 18, 2007
INVENTOR(S) : Sebot et al.

It is certified that error appears in the above-identified patent and that said Letters Patent is hereby corrected as shown below:

In column 34, at line 7, delete "modem" and insert --modern--.

Signed and Sealed this

Twenty-ninth Day of April, 2008

JON W. DUDAS
*Director of the United States Patent and Trademark Office*